(12) United States Patent
Clement et al.

(10) Patent No.: US 12,044,424 B2
(45) Date of Patent: Jul. 23, 2024

(54) VARIABLE AIR VOLUME SYSTEMS WITH FILTRATION AND AIR QUALITY CONTROL

(71) Applicant: Tyco Fire & Security GmbH, Neuhausen am Rheinfall (CH)

(72) Inventors: Bernard P. Clement, Mequon, WI (US); Jonathan D. Douglas, Mequon, WI (US); Kirk H. Drees, Cedarburg, WI (US); Clay G. Nesler, Washington, DC (US); Tyler A. Smith, Nolensvilled, TN (US); Juliet A. Pagliaro Herman, Waukesha, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 132 days.

(21) Appl. No.: 17/409,493

(22) Filed: Aug. 23, 2021

(65) Prior Publication Data
US 2022/0057099 A1    Feb. 24, 2022

Related U.S. Application Data

(60) Provisional application No. 63/069,532, filed on Aug. 24, 2020.

(51) Int. Cl.
*F24F 11/63* (2018.01)
*G05B 17/02* (2006.01)

(52) U.S. Cl.
CPC .............. *F24F 11/63* (2018.01); *G05B 17/02* (2013.01)

(58) Field of Classification Search
CPC .......... F24F 11/63; F24F 11/0001; F24F 3/16; F24F 8/10; F24F 1/0007; G05B 17/02; B64D 13/06
See application file for complete search history.

(56) References Cited

U.S. PATENT DOCUMENTS

| | | | | |
|---|---|---|---|---|
| 5,516,330 A | * | 5/1996 | Dechow ................. | B64D 13/08 165/235 |
| 6,464,760 B1 | * | 10/2002 | Sham ................. | B01D 53/0415 55/318 |
| 10,981,436 B2 | * | 4/2021 | Stahl .................... | B01D 46/442 |

(Continued)

FOREIGN PATENT DOCUMENTS

| | | | | |
|---|---|---|---|---|
| EP | 3925883 A1 | * | 12/2021 | ............. A61L 9/014 |
| WO | WO-2016087357 A2 | * | 6/2016 | ............. A61L 2/202 |
| WO | WO-2021/258116 A1 | | 12/2021 | |

OTHER PUBLICATIONS

U.S. Appl. No. 17/013,273.
(Continued)

*Primary Examiner* — Alicia M. Choi
(74) *Attorney, Agent, or Firm* — Foley & Lardner LLP

(57) ABSTRACT

A variable air volume (VAV) box includes a fan operable to induce airflow from a building space through the VAV box and discharge the airflow back to the building space, an air cleaning device positioned to clean the airflow through the VAV box before discharging the airflow back to the building space and configured to affect an air quality of the airflow, and a controller configured to operate the fan to modulate the airflow through the VAV box to achieve a target air quality for at least one of the airflow discharged from the VAV box or air within the building space.

43 Claims, 15 Drawing Sheets

(56) References Cited

U.S. PATENT DOCUMENTS

| | | | |
|---|---|---|---|
| 11,513,486 B2 | 11/2022 | Kupa et al. | |
| 2003/0150593 A1* | 8/2003 | Sekhar | F24F 3/0442 |
| | | | 165/59 |
| 2005/0150382 A1* | 7/2005 | Sheehan | B01D 46/22 |
| | | | 96/429 |
| 2006/0234621 A1* | 10/2006 | Desrochers | G01N 1/26 |
| | | | 702/50 |
| 2007/0059225 A1* | 3/2007 | Willette | A61L 9/16 |
| | | | 422/186.3 |
| 2007/0157586 A1* | 7/2007 | Kowalski | B60H 1/00849 |
| | | | 55/385.3 |
| 2009/0235816 A1* | 9/2009 | Farrugia | B01D 53/62 |
| | | | 422/177 |
| 2011/0265436 A1* | 11/2011 | Platt | B29C 48/0021 |
| | | | 55/497 |
| 2013/0183214 A1* | 7/2013 | Metteer | A61L 9/015 |
| | | | 422/123 |
| 2013/0298773 A1* | 11/2013 | Yamagishi | G03B 21/16 |
| | | | 96/15 |
| 2014/0214214 A1* | 7/2014 | Asmus | F24F 11/62 |
| | | | 702/183 |
| 2015/0300677 A1* | 10/2015 | Wang | F24F 3/16 |
| | | | 55/385.2 |
| 2015/0323427 A1* | 11/2015 | Sharp | G01N 1/2273 |
| | | | 73/863.23 |
| 2016/0098020 A1* | 4/2016 | Salsbury | G05B 11/42 |
| | | | 700/32 |
| 2018/0154297 A1* | 6/2018 | Maletich | F24F 3/16 |
| 2018/0274807 A1* | 9/2018 | Cosby, II | F24F 11/72 |
| 2019/0086107 A1* | 3/2019 | Poluri | F24F 11/30 |
| 2020/0269171 A1* | 8/2020 | Vaidya | F24F 8/108 |
| 2021/0011444 A1 | 1/2021 | Risbeck et al. | |
| 2021/0193309 A1 | 6/2021 | Boisvert et al. | |
| 2021/0390807 A1 | 12/2021 | Chaurasia et al. | |
| 2021/0390812 A1 | 12/2021 | Chaurasia et al. | |
| 2021/0391089 A1 | 12/2021 | Eswara et al. | |
| 2021/0398659 A1 | 12/2021 | Sharma et al. | |
| 2021/0398690 A1 | 12/2021 | Gibson et al. | |
| 2021/0398691 A1 | 12/2021 | Dhamija et al. | |
| 2022/0060856 A1 | 2/2022 | Wellig et al. | |
| 2022/0203287 A1 | 6/2022 | Wenger et al. | |
| 2022/0203288 A1 | 6/2022 | Wenger et al. | |
| 2022/0205962 A1 | 6/2022 | Vanderkoy | |
| 2022/0207215 A1 | 6/2022 | Liu et al. | |
| 2022/0221184 A1 | 7/2022 | Gupta et al. | |
| 2022/0228756 A1 | 7/2022 | Gupta et al. | |
| 2022/0254483 A1 | 8/2022 | Boisvert et al. | |
| 2022/0277851 A1 | 9/2022 | Wellig | |
| 2022/0282886 A1 | 9/2022 | Hriljac et al. | |
| 2022/0293261 A1 | 9/2022 | McBrady et al. | |
| 2022/0305438 A1 | 9/2022 | Wenger et al. | |
| 2022/0305881 A1 | 9/2022 | Neu et al. | |

OTHER PUBLICATIONS

U.S. Appl. No. 17/013,273, filed Sep. 4, 2020, Honeywell Int Inc.

Alvarado et al., "A Methodology to Monitor Airborne PM10 Dust Particles Using a Small Unmanned Aerial Vehicle," Sensors, 2017, vol. 17 (25 pages).

* cited by examiner

VARIABLE AIR VOLUME SYSTEMS WITH FILTRATION AND AIR QUALITY CONTROL

CROSS-REFERENCE TO RELATED APPLICATION

This application claims the benefit of and priority to U.S. Provisional Patent Application No. 63/069,532, filed Aug. 24, 2020, the entire disclosure of which is incorporated by reference herein.

BACKGROUND

The present disclosure relates generally to the field of building equipment for a building and more particularly to variable air volume systems adapted to provide improved indoor air quality for the building.

SUMMARY

One implementation of the present disclosure is a variable air volume (VAV) box for a building HVAC system. The VAV box includes a fan operable to induce airflow from a building space through the VAV box and discharge the airflow back to the building space, an air cleaning device positioned to clean the airflow through the VAV box before discharging the airflow back to the building space and configured to affect an air quality of the airflow, and a controller configured to operate the fan to at least partially control the airflow through the VAV box to achieve a target air quality for at least one of the airflow discharged from the VAV box or air within the building space.

In some embodiments, the VAV box includes a damper operable to modulate a second airflow through the VAV box. In some embodiments, the second airflow is received from an air handling unit that provides airflow to the VAV box. In some embodiments, the controller is configured to operate both the fan and the damper to adjust a first amount of the airflow induced by the fan and a second amount of the second airflow received from the air handling unit to achieve the target air quality.

In some embodiments, the controller is located within the VAV box or physically coupled to the VAV box.

In some embodiments, the controller is located outside the VAV box and configured to send commands to the VAV box via a data connection between the controller and the VAV box.

In some embodiments, the controller is located within at least one of the building space to which the VAV box discharges the airflow, a same building as the VAV box but outside the building space to which the VAV box discharges the airflow, a different building from the building in which the VAV box is located, or a cloud-based computing system separate from the building in which the VAV box is located.

In some embodiments, the air cleaning device is a filter. The air cleaning device may be an electrostatic filter, and circuitry of the VAV box may provide electricity to both the fan and the electrostatic filter. The fan may be an axial fan.

Another implementation of the present disclosure is a variable air volume box for a building HVAC system. The VAV box includes a first air inlet configured to receive primary airflow from an air handling unit of the building HVAC system, a damper operable to modulate the primary airflow through the VAV box, a second air inlet configured to receive secondary airflow drawn from air within a building space, one or more air outlets configured to discharge a total airflow from the VAV box to the building space, the total airflow comprising the primary airflow and the secondary airflow, a fan positioned between the second air inlet and/or the first air inlet and the one or more air outlets and operable to control (modulate) airflow (e.g., second airflow, total airflow) through the VAV box, an air filter positioned between the second air inlet and/or the first air inlet and the one or more air outlets and configured to affect an air quality of the secondary airflow, and a controller configured to operate the fan to control the airflow based on a target air quality value for at least one of the total airflow or the air within the building space.

In some embodiments, the air filter and the second air inlet are positioned at a boundary of the building space and a secondary air plenum is located between the filter and the fan to guide the secondary airflow between the filter and the fan. The boundary of the building space may be defined by a drop ceiling and the air filter is accessible from the building space beneath the drop ceiling.

In some embodiments, the target air quality value is a target value for an air quality metric that is affected by filtering the secondary airflow. In some embodiments, the controller is further configured to operate the damper to control the primary airflow. The controller may be configured to determine a fan setpoint and a damper setpoint based on the target air quality value.

In some embodiments, the target air quality value is a threshold airflow. The target air quality value may be determined as a function of occupancy of the building space. The target air quality value may be determined as a function of an infection probability.

In some embodiments, the controller is configured to use known or estimated values of a property of the primary airflow and a property of the secondary airflow to determine target proportions of the primary airflow and the secondary airflow to combine to create the total airflow to achieve the target air quality value.

In some embodiments, the air filter is selectively repositionable relative to the first air inlet and the second air inlet to selectively filter airflows through either or both of the first air inlet or the second air inlet. The VAV box may include an actuator configured to reposition the air filter.

In some embodiments, the VAV box includes a replacement mechanism configured to be automatically controlled by the controller to remove the air filter and install a new air filter. In some embodiments, the VAV box includes a sterilization component configured to sterilize the air filter in response to a determination that the air filter should be replaced.

Another implementation of the present application is an HVAC system. The HVAC system includes a variable air volume (VAV) box, a removable filter positioned between a zone air intake of the VAV box and outlet of the VAV box, a controller configured to operate the VAV box in a normal operating mode, switch operation of the VAV box to a filtration operating mode in response to an indication, and operate the VAV box in the filtration operating mode. The VAV box is operated to provide different airflows in the filtration operating mode as compared to the normal operating mode.

In some embodiments, the removable filter is accessible from below a drop ceiling. In some embodiments, the controller is configured to operate the VAV box in the filtration operating mode by controlling one or more of the different airflows based on a threshold airflow amount for the filtration operating mode. The threshold airflow amount may be determined as a function of an estimated infection risk. The threshold airflow amount may be determined as a function of measured pollution in a space served by the VAV box. The threshold airflow amount may be determined as a function of occupancy in a space served by the VAV box.

In some embodiments, the controller is configured to determine that the removable filter should be removed and replaced based on measurements of a current drawn by a fan motor of the VAV box. The controller is configured to generate a notification to a user in response to determining that the removable filter should be replaced.

Another implementation of the present disclosure is a method of purifying airflow in a building space. The method includes directing a primary airflow through a first filter located at an air handling unit, directing a secondary airflow through a second filter located in an airflow pathway for an induced air inlet of a variable air volume box, controlling the variable air volume box to mix the primary airflow and the secondary airflow after filtration by the first filter and the second filter before discharge to a building space. Controlling the variable air volume box includes controlling a fan of the variable air volume box using a first set of control logic in a normal operating mode and controlling the fan using a second set of control logic in response to an indication that enhanced air filtration is required for the building space.

In some embodiments, controlling the fan using the second set of control logic comprising generating a control signal for the fan based on measured occupancy of the building space. In some embodiments, controlling the fan using the second set of control logic comprising generating a control signal for the fan based on estimated infection risk for occupants of the building space. In some embodiments, controlling the fan using the second set of control logic comprising generating a control signal for the fan based on a particulate matter measurement at the building space.

In some embodiments, controlling the variable air volume box also includes monitoring a current draw of a motor of the fan, determining, based on the current draw, that the second filter is in condition to be replaced, and generating a notification indicating that the second filter should be replaced.

In some embodiments, controlling the variable air volume box also includes monitoring a current draw of a motor of the fan, determining, based on the current draw, that the second filter is in condition to be replaced, and automatically replacing the second filter with a new second filter.

In some embodiments, controlling the variable air volume box also includes monitoring a current draw of a motor of the fan, determining, based on the current draw, that the second filter is in condition to be replaced, and automatically treating the second filter with ultraviolet light before allowing the second filter to be accessed by a person.

Another implementation of the present disclosure is a method of controlling a variable air volume (VAV) box that serves a building space. The method includes determining an occupancy schedule for the building space, controlling the VAV box to run a first zone flush sequence in advance of an expected occupation of the building space based on the occupancy schedule, controlling the VAV box to run a normal operating mode to provide occupant comfort during the expected occupation of the building space, and controlling the VAV box to run a second zone flush sequence after the expected occupation of the building space.

In some embodiments, controlling the VAV box to run the first zone flush sequence includes controlling a fan of the VAV box to cause air from the building zone to recycle through a filter associated with the VAV box. In some embodiments, controlling the VAV box to run the first or second zone flush sequence includes causing at least a threshold portion of a total air volume in the building space to pass through a filter associated with the VAV box.

In some embodiments, the second zone flush sequence is configured to remove airborne pathogens from air in the building space, the airborne pathogens shed by occupants of the building space during the expected occupation. In some embodiments, determining the occupancy schedule for the building space comprises predicting the expected occupation of the building space based on historical occupancy measurements. In some embodiments, determining occupancy schedule for the building space comprises receiving an indication of the expected occupation from a scheduling system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Modern society is experiencing an increase in airborne pathogens (e.g., coronaviruses, influenza viruses, Ebola viruses, etc.) and other pollutants (e.g., particulate matter, smog, etc.). Such pathogens and pollution can be particularly prevalent in enclosed indoor spaces, and indoor spaces can be perceived as particularly risky with regards to spreading of infectious disease or exposure to other pollutants. One aspect of the present disclosure is a recognition that such risks or perceived risks can be addressed through equipment design to improve indoor air quality.

The present disclosure relates to configuring variable air volume (VAV) boxes of a heating, ventilation, and cooling (HVAC) system to filter indoor air to reduce the presence of airborne pathogens or other airborne pollutants in building spaces. In buildings where HVAC systems include VAV boxes, this provides filtration of indoor air and improved air quality without the need for additional equipment installation and without the energy costs associated with operating stand-alone filtration systems. Placing filtration at the VAV boxes also provide for control of air filtration at the building zone level, rather than only a full-building level, and can improve the resulting indoor air quality as compared to providing filtration only at a central air handling unit.

The features described in detail below include hardware elements and design changes to VAV boxes to enable filtration at the VAV box and to facilitate efficient operation and easy maintenance of the filtration-enabled VAV boxes. The features described in further detail below include control schemes for the filtration-enabled VAV boxes, including on-demand switching between a first normal operating mode and a second mode where filtration is prioritized (e.g., during an infectious disease outbreak, during a period of high environmental pollution). Various features for providing effective and efficient filtration of indoor air by a VAV box and HVAC systems including VAV boxes are described in detail below.

Building HVAC Systems and Building Management Systems

Figure 1:
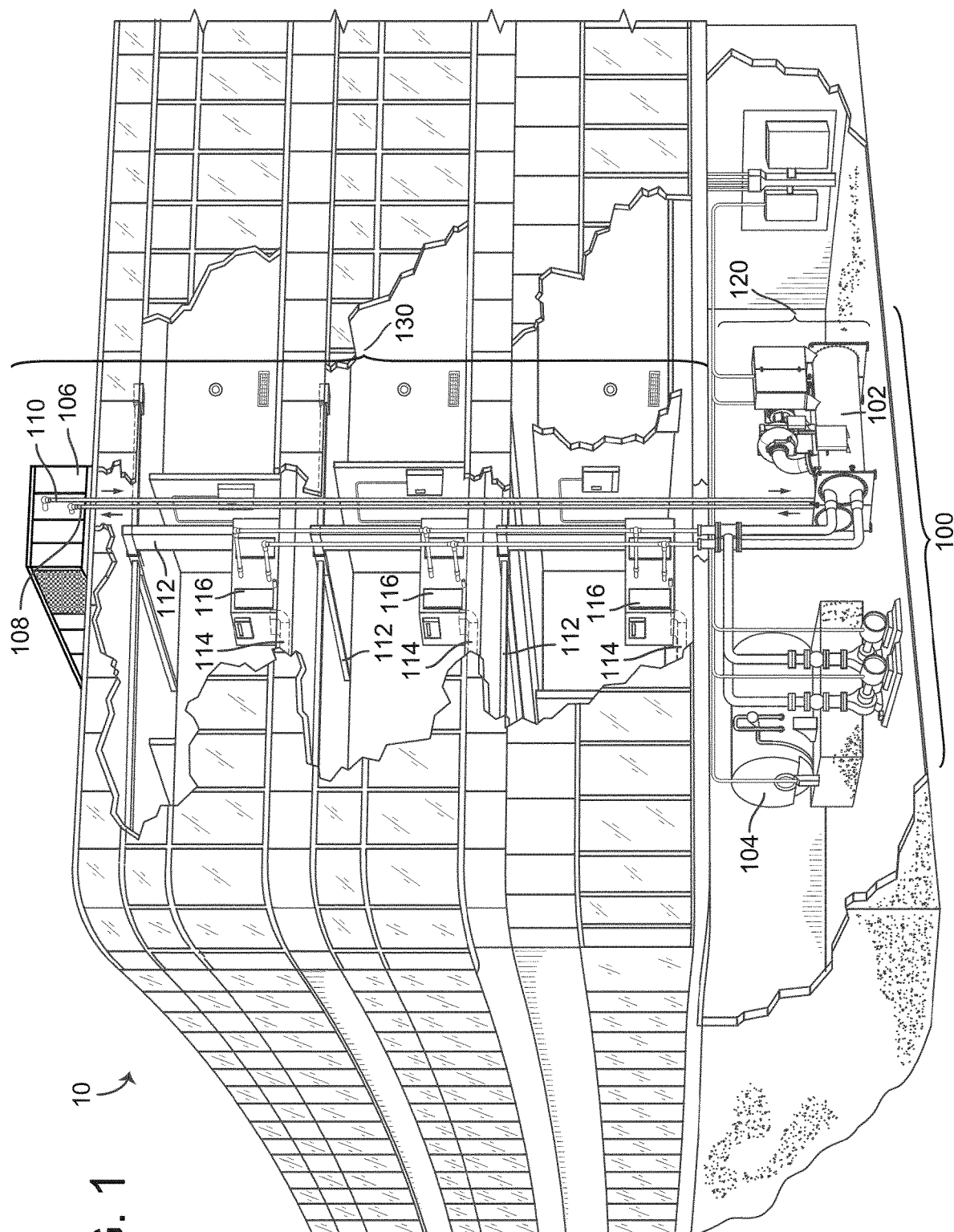
FIG. 1 is a drawing of a building equipped with a HVAC system, according to some embodiments.
Figure 2:
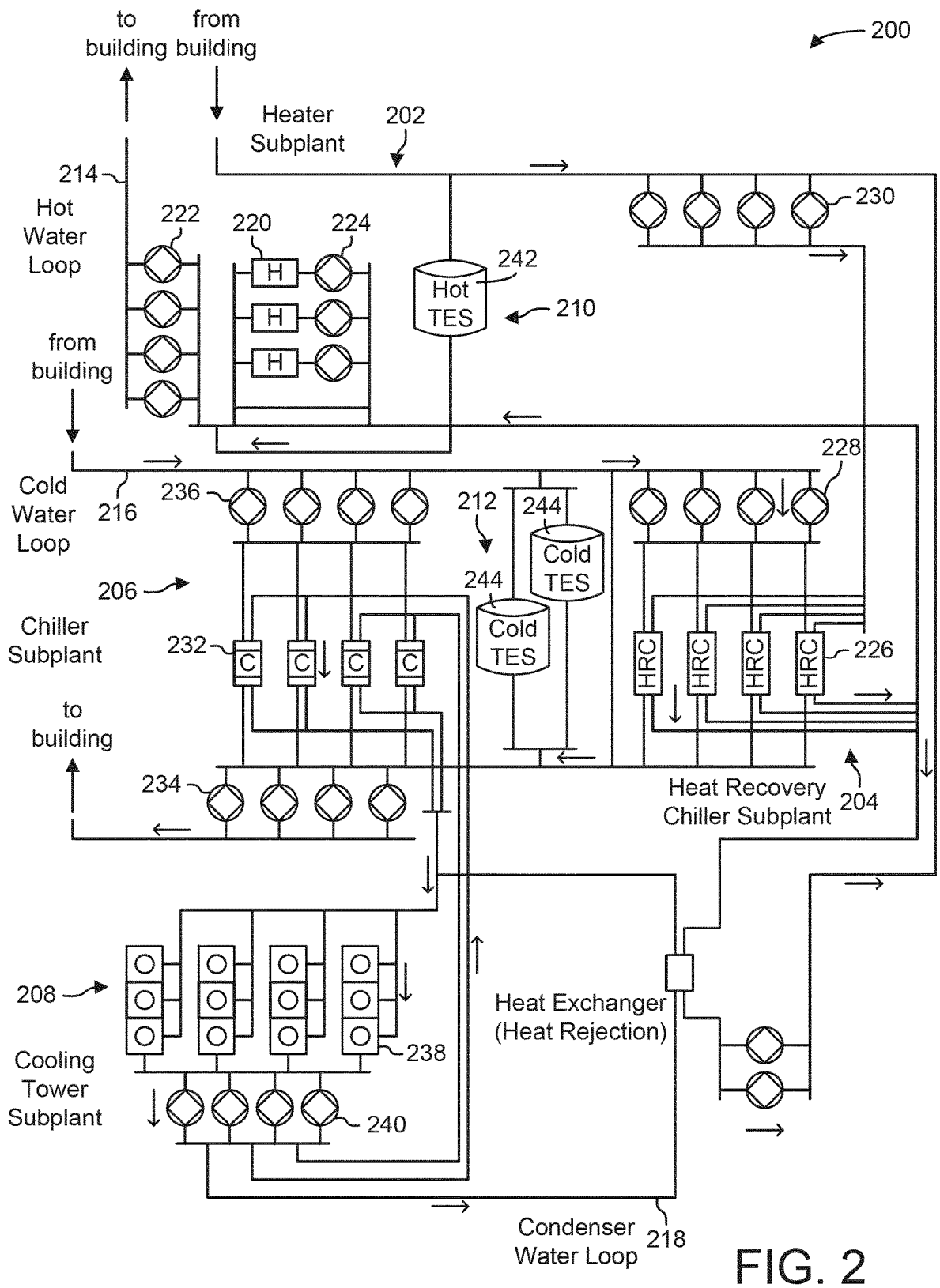
FIG. 2 is a block diagram of a waterside system which can be used to serve the heating or cooling loads of the building of FIG. 1, according to some embodiments.
Figure 3:
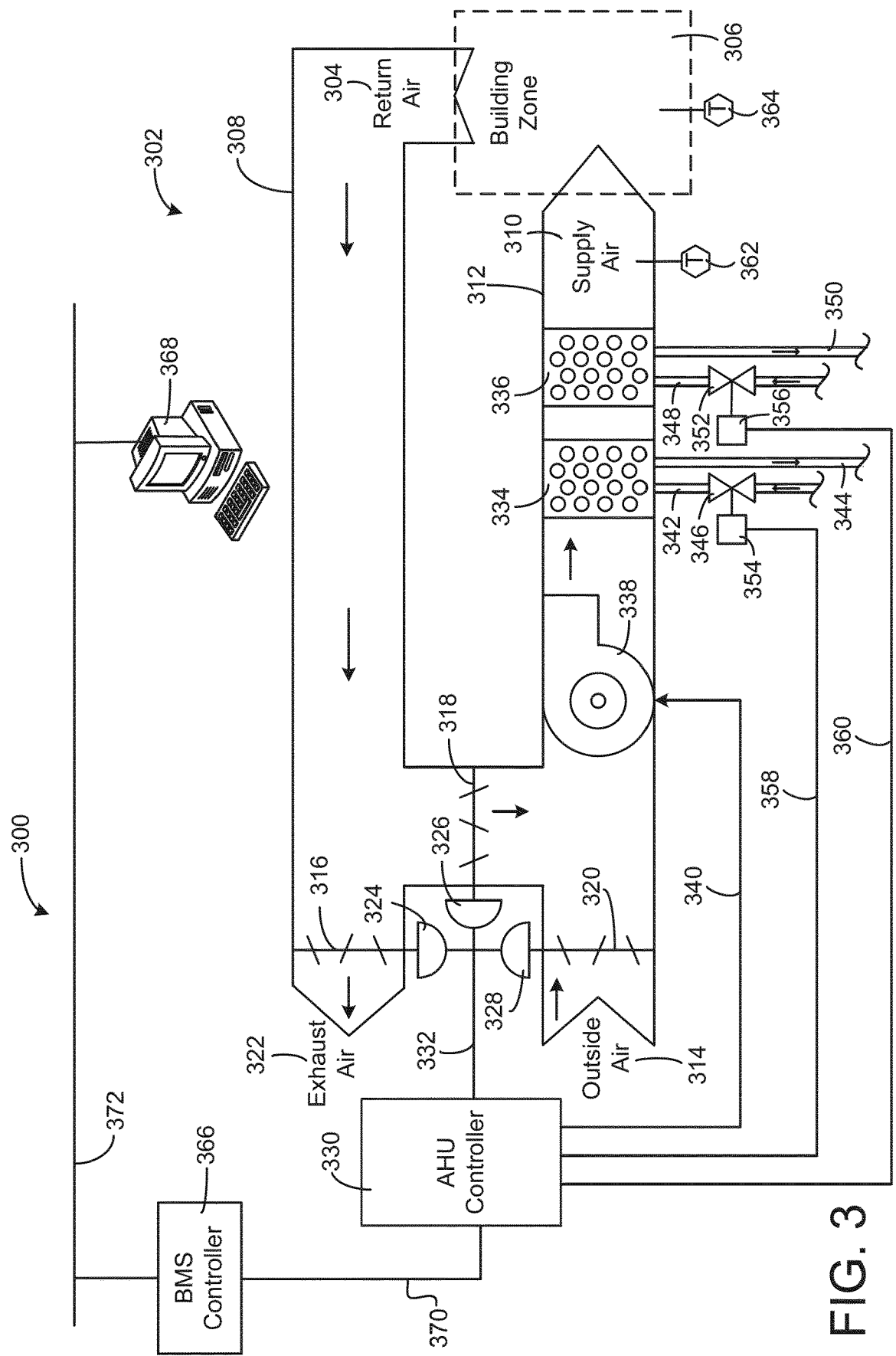
FIG. 3 is a block diagram of an airside system which can be used to serve the heating or cooling loads of the building of FIG. 1, according to some embodiments.
Figure 4:
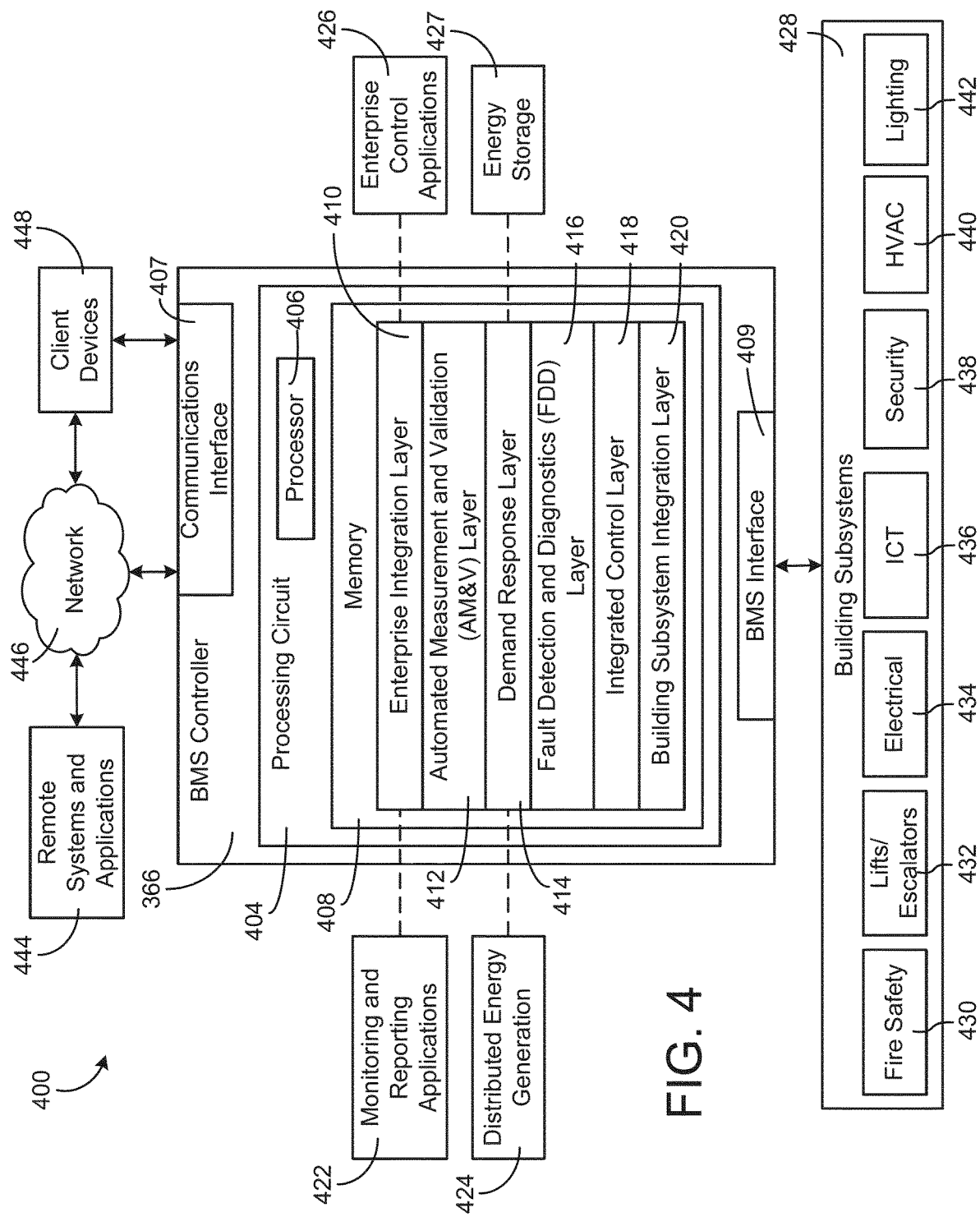
FIG. 4 is a block diagram of a building management system (BMS) which can be used to monitor and control the building of FIG. 1, according to some embodiments.
Figure 5:
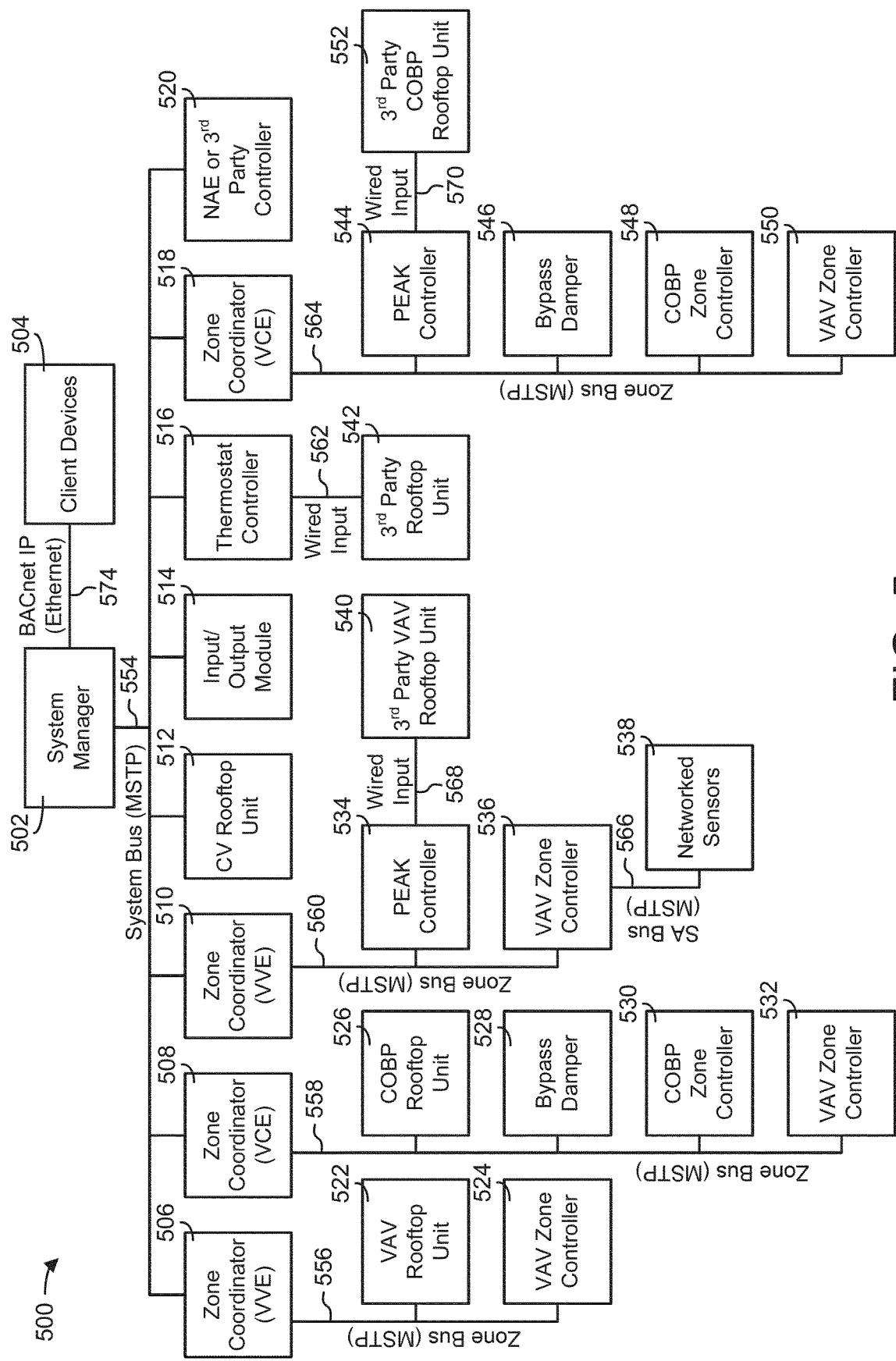
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements.

AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200. In some embodiments, the airside system 300 includes a filtration system, for example as described in detail below with reference to FIGS. 8-18.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heated or cooled supply air 310 to a zone of a building by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Variable Air Volume Boxes

Figure 6:
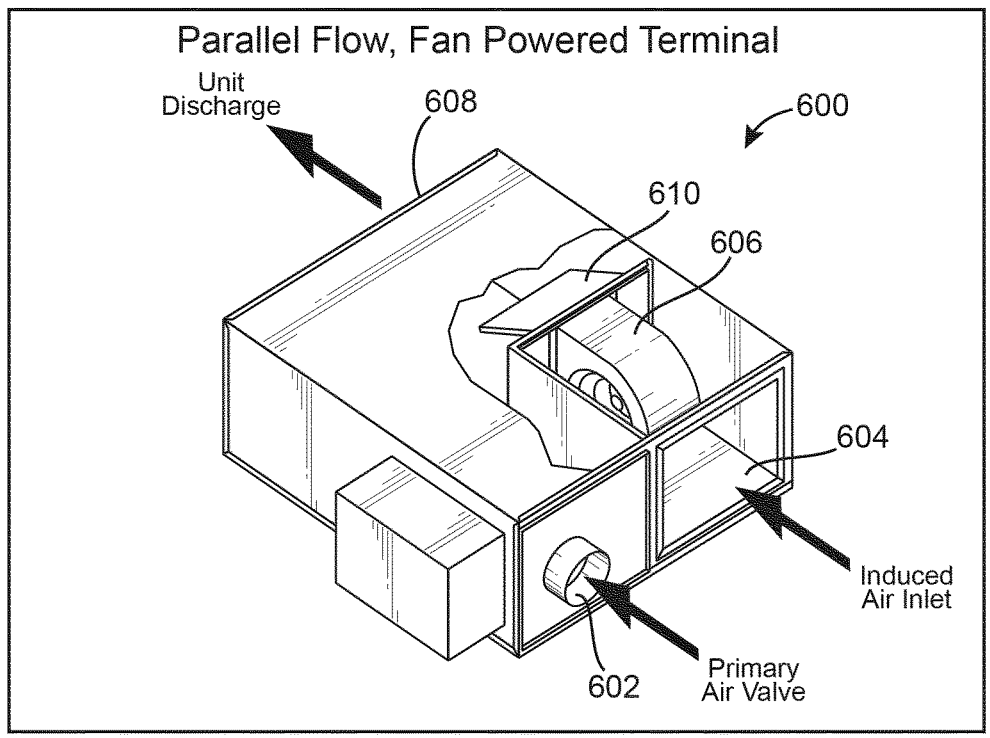
FIG. 6 is a cut-away perspective view of a parallel flow variable air volume (VAV) box, according to some embodiments.

Referring now to FIG. 6, a perspective, cut-away view of a parallel flow VAV box 600 is shown, according to an exemplary embodiment. The parallel flow VAV box 600 may be used in an HVAC system, for example in the place of VAV boxes 116 of HVAC system 100 of FIG. 1.

As shown in FIG. 6, the VAV box 600 includes a primary air valve 602, an induced air inlet 604, a fan 606, a unit discharge 608, and a backdraft damper 610. The primary air valve 602 is configured to be connected via ductwork to an output of an air handling unit or to rooftop, for example such that the primary air valve 602 can receive conditioned air from the air handling unit. The primary air valve 602 includes a damper coupled to an actuator. The actuator can be controlled to adjust the damper position to increase or decrease the amount of airflow from the air handling unit into the VAV box 600. The actuator can be controlled by a controller included in a building management system, for example VAV zone controller 532, VAV zone controller 536, or VAV zone controller 550 of the example of FIG. 5.

The primary air valve 602 is connected to the zone served by the VAV box 600, such that conditioned air from the air handling unit which passes through the primary air valve 602 flows into the space via the unit discharge 608. The conditioned air is pushed across the primary air valve 602 by fans of the air handling unit. Accordingly, by controlling the amount of conditioned air which moves through the primary air valve 602 by adjusting the damper position, the primary air valve 602 can be used to control the amount of heating or cooling provided to the zone.

The induced air inlet 604 is connected to the building plenum in pneumatic communication with the building zone served by the VAV box 600. That is, the induced air inlet 604 is exposed to and receives air from the indoor air in the zone. The induced air inlet 604 thereby allows the VAV box 600 to intake air from the zone. In some cases, the induced air inlet 604 is ducted to the indoor air (e.g., across a drop ceiling). In other embodiments, leaks between tiles in a drop ceiling is sufficient to place the induced air inlet 604 in pneumatic communication with the building zone to receive air from the zone.

The fan 606 operates to draw indoor air into the VAV box 600 via the induced air inlet. Operating the fan 606 at different fan speeds causes different amounts of air to be drawn into the VAV box 600 via the induced air inlet. The fan speed can thus be adjusted to control an amount of air which is recycled from the zone through the VAV box 600.

In some cases, the fan 606 is turned off and a backdraft damper 610 is closed to prevent air from flowing backwards across the fan and out the induced air inlet 604. The backdraft damper 610 can be opened when the fan 606 is turned on. The backdraft damper 610 is omitted in some embodiments. The current draw or power consumption of an electric motor of the fan 606 needed to run the fan 606 at a selected fan speed can be indicative of a resistance to air flow into the induced air inlet, for example caused by a filter as described in detail below. The fan 606 is shown as a curved blower (e.g., squirrel cage fan, centrifugal fan), where a motor operates to drive rotation of an impeller which accelerates air through a housing in a direction tangential to the rotation of the impeller. In other embodiments, the fan 606 is an axial fan, for example a prop fan or a vane axial fan, in which a motor drives rotation of fan blades that accelerate air in a direction parallel to an axis of rotation of the props.

As illustrated in FIG. 6 for the parallel flow VAV box 600, conditioned air from the primary air valve 602 and recycled indoor air from the induced air inlet 604 can mix in the VAV box 600 after the recycled indoor air has passed through the fan 606 and before the mixed air exits the VAV box via the unit discharge 608. The airflow of conditioned air from the AHU can be controlled using an AHU control system and the primary air valve 602 independently of the amount of recycled air pushed through the VAV box 600 by the fan 606. Allowing for mixing of conditioned air and recycled air in the VAV box 600 can provide airflow into the space at a temperature between the supply air temperature of the AHU and the indoor air temperature, which can minimize temperature gradients, drafts, etc. in the zone which may be uncomfortable for occupants. The parallel flow VAV box 600 can also be used to manage ventilation and air movement in the space without over-cooling or over-heating the zone. As described in detail below, the VAV box 600 can also be adapted to provide filtration of indoor air in the building zone and can be controlled to prioritize air filtration.

Figure 7:
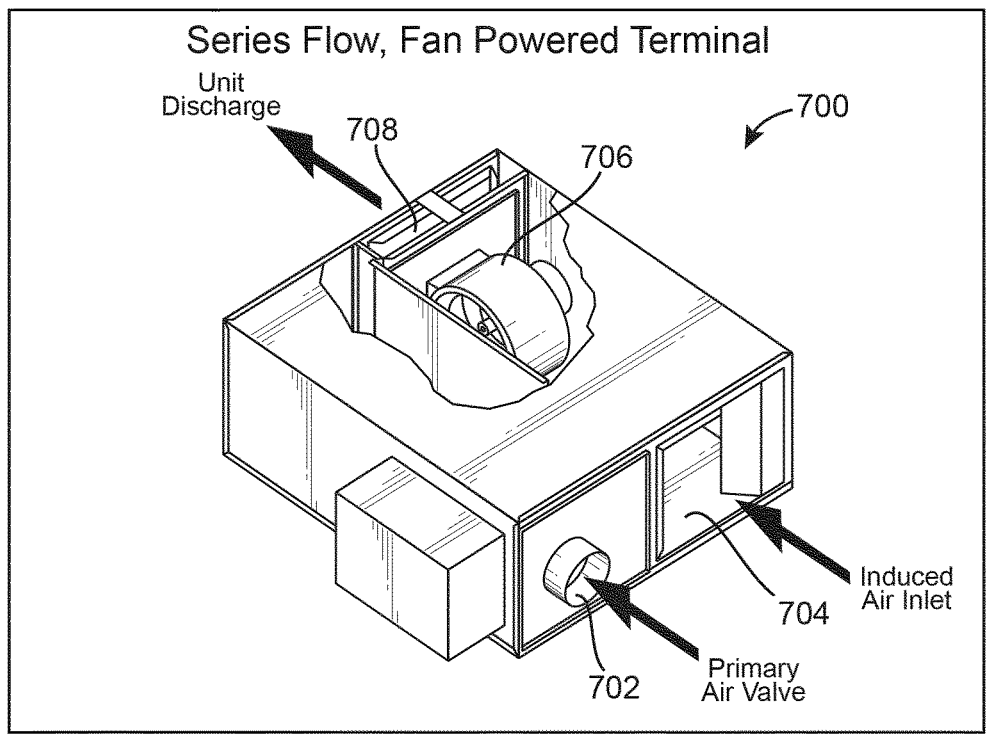
FIG. 7 is a cut-away perspective view of a series flow VAV box, according to some embodiments.

Referring now to FIG. 7, a perspective, cut-away view of a series flow VAV box 700 is shown, according to an exemplary embodiment. The series flow VAV box 700 includes a primary air valve 702, an induced air inlet 704, and fan 706, and a unit discharge 708. The fan 706 is shown as a curved blower and may be an axial fan (e.g., prop fan, vane axial fan) in other embodiments.

The primary air valve 702 is configured to be connected via ductwork to an output of an air handling unit, such that the primary air valve 702 can receive conditioned air from the air handling unit. The primary air valve 702 includes a damper coupled to an actuator. The actuator can be controlled to adjust the damper position to increase or decrease the amount of airflow from the air handling unit into the VAV box 700. The actuator can be controlled by a controller included in a building management system, for example VAV zone controller 532, VAV zone controller 536, or VAV zone controller 550 of the example of FIG. 5.

The induced air inlet 704 is connected to the building plenum in pneumatic communication with the building zone served by the VAV box 600. That is, the induced air inlet 704 is exposed to and receives air from the indoor air in the zone. The induced air inlet 704 thereby allows the VAV box 700 to intake air from the zone.

As shown for the example of a series flow VAV box 700 in FIG. 7, conditioned air from the primary air valve 702 and recycled indoor air form the induced air inlet 704 mix in the VAV box 700 before the mixed air passes through the fan 706. The fan 704 is operable to force the mixed air out of the VAV box 700 via the unit discharge 708. The relative amounts of conditioned air and recycled air which are moved out of the unit discharge 708 are functions of the damper position of the primary air valve 702 and the fan speed of the fan 706. The fan speed and the damper position can be controlled to provide different levels of airflow at different temperatures out of the VAV box 700 via the unit discharge 708. The series flow VAV box 700 can be controlled to manage airflow and ventilation without over-cooling or over-heating the zone. The series flow VAV box 700 can also be adapted to can also be adapted to provide filtration of indoor air in the building zone and can be controlled to prioritize air filtration.

HVAC System with VAV Boxes and Enhanced Filtration

Figure 8:
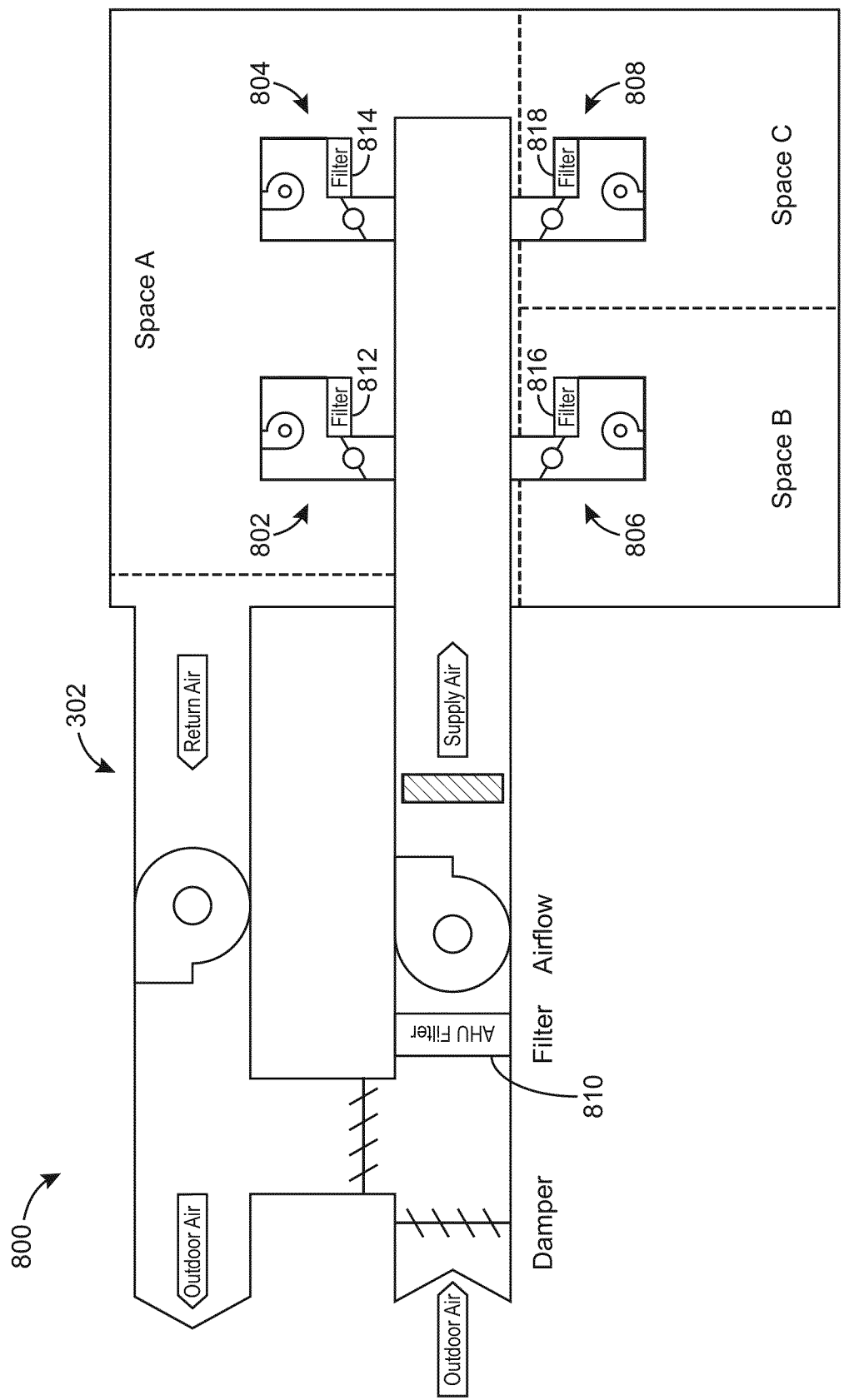
FIG. 8 is a schematic diagram of an HVAC system having an air handling unit and multiple VAV boxes with enhanced filtration, according to some embodiments.

Referring now to FIG. 8, an HVAC system 800 which includes an air handling unit and multiple VAV boxes is shown, according to an exemplary embodiment. In the example shown, the HVAC system 800 is configured to serve three spaces (zones) of a building, denoted as Space A, Space B, and Space C. Various configurations are possible depending on the size, layout, number zones (e.g., floors, rooms, etc.), or other features of a building served by an HVAC system.

The HVAC system 800 includes an air handling unit, shown as air handling unit (AHU) 302. AHU 302 is described in detail above with reference to FIG. 3. AHU 302 is configured to receive return air from the building (from Spaces A, B, and C) and to provide conditioned (heated or cooled) supply air to multiple VAV boxes that serve the space. In the example of FIG. 8, AHU 302 provides supply air to a first VAV box 802 and a second VAV box 804, both of which serve Space A. AHU 302 is also shown as providing supply air to third VAV box 806 that serves Space B, and a fourth VAV box 808 that serves Space C.

In the embodiment shown in FIG. 8, the first VAV box 802, the second VAV box 804, the third VAV box 806, and the fourth VAV box 808 are series flow VAV boxes, for example configured as shown in FIG. 7 and described with reference thereto. In other embodiments, the VAV boxes 802, 804, 806, 808 may be parallel flow VAV boxes or a combination of series flow VAV boxes and parallel flow VAV boxes, as described with reference to FIGS. 6-7. Each of the VAV boxes 802, 804, 806, 808 may include a fan, an air filter, and a damper. The fan can be controlled to increase the amount of recycled air pulled from the building space and through the filter to provide local filtration of the recycled air. The damper can be controlled to adjust the amount of supply air (conditioned air) from the AHU 302 that flows through the VAV box and into the building zone.

The VAV boxes 802, 804, 806, 808 can be independently controlled to vary the airflow and mix of recycled and conditioned air provided to the different spaces by the VAV boxes 802, 804, 806, 808. In the example shown, the first VAV box 802 can be controlled to vary the airflow and supply air temperature provided at a first area of Space A, while the second VAV box 804 can be controlled to vary the airflow and supply air temperature provided at a second area of Space A. The third VAV box 806 can be controlled to vary the airflow and supply air temperature provided at Space B, while the fourth VAV box 808 can be controlled to vary the airflow and supply air temperature provided at Space C.

Airflow through each of the VAV boxes 802, 804, 806, 808 can be increased by opening the corresponding damper (either completely or partially) or increasing the fan speed of the corresponding fan within the VAV box. Similarly, airflow through each of the VAV boxes 802, 804, 806, 808 can be decreased by closing the corresponding damper (either completely or partially) or decreasing the fan speed of the corresponding fan within the VAV box. The fraction or ratio of the supply air from the AHU 302 provided to each building space that relative to the recycled air that flows through the filters 812, 814, 816, and 818 can be adjusted by varying the damper positions and fan speeds of the dampers and fans within the VAV boxes 802, 804, 806, 808. The temperature of the air exiting each of the VAV boxes 802, 804, 806, 808 can also be adjusted by varying the relative amounts or proportions of supply air from the AHU 302 and recycled air from the building spaces that pass through the VAV boxes 802, 804, 806, 808 (i.e., by operating the dampers and fan speeds). For example, if the supply air from the AHU 302 has a known (e.g., measured, controlled, estimated, predicted, etc.) temperature and the recycled air from the building spaces has a known temperature, a controller for the VAV boxes 802, 804, 806, 808 can calculate the amount of supply air from the AHU 302 and the amount of recirculated air from the building spaces needed to ensure that the air exiting the VAV boxes 802, 804, 806, 808 has a desired temperature.

In some embodiments, a controller that operates the controllable components of the VAV boxes 802, 804, 806, 808 (e.g., fans, dampers, actuators, etc.) is located within the VAV boxes 802, 804, 806, 808 or physically coupled to the VAV boxes 802, 804, 806, 808. For example, each of the VAV boxes 802, 804, 806, 808 may contain an embedded controller or may be physically coupled (e.g., attached) to a dedicated controller for the corresponding VAV box 802, 804, 806, 808. Alternatively, the controller may be located outside the VAV box and configured to send commands to the VAV box via a data connection between the controller and the VAV box. The controller may be a dedicated controller for a particular VAV box 802, 804, 806, 808 or may be configured to control multiple VAV boxes 802, 804, 806, 808. In various embodiments, the controller may be located within the building space to which the VAV box discharges the airflow (e.g., within a wall-mounted thermostat, user device, or other control device within the building space), within a same building as the VAV box but outside the building space to which the VAV box discharges the airflow (e.g., a controller for a building management system that controls various building functions, an AHU controller for the building or for the AHU that provides airflow to the VAV boxes), within a different building from the building in which the VAV box is located (e.g., another building on the same campus or premises as the building in which the VAV box is located), part of a cloud-based computing system separate from the building in which the VAV box is located (e.g., a cloud-hosted control system or cloud-based building management system that communicates with the VAV box via a network), or any other location. In some embodiments, the controller is a single device (e.g., contained within a single housing) or may be split across multiple devices that may exist at multiple locations (e.g., multiple controllers that each perform a portion of the control activities described herein. In some embodiments, separate controllers are used to provide temperature control for the space and to control filtration modes of the VAV boxes.

As shown in FIG. 8, the HVAC system 800 includes multiple filters. An AHU filter 810 is provided in the air handling unit 302 and positioned such that outdoor air or return air flowing into the AHU 302 passes through the AHU filter 810 before being pushed to the VAV boxes by as supply air. The AHU filter 810 is configured filter the air such that the conditioned air provided to the VAV boxes 802, 804, 806, 808 for supply to building has been centrally filtered at the AHU 302. The AHU filter 810 may be a high-efficiency particulate air (HEPA) filter, for example removing at least 99.97% of particles having diameters of 0.3 microns from the air passing through the filter 810, and improving in performance for other diameters. In some embodiments, the AHU filter 810 may be configured to remove approximately 95% of airborne particles having a most penetrating particle size, for example around 0.3 microns, which may correspond to the filtration efficiency of medical-grade respirator masks (e.g., N-95 rated). Filters of various materials, fiber diameters, thicknesses, porosities, etc. can be used to achieve these levels of filtration while also allowing for sufficient airflow through the filter 810. In some embodiments, the AHU filter 810 may be a filter specifically adapted to capture and/or neutralize (kill, disable, render harmless) airborne pathogens. For example, copper or other conductive materials may be included which are known to destroy viruses or other pathogens which are trapped in contact with such surfaces. As yet another example, the AHU filter 810 may be an electrostatic filter, for example an electrostatic filter having a set of charged wires that ionize particles in the air and a set of collector plates (surfaces, etc.) which are charged to attract the ionized particles, thereby providing a high level of air cleaning. Various designs are possible in various embodiments of the AHU filter 810. The AHU 302 is thereby configured to provide clean, filtered air to the building.

In some embodiments, the AHU filter 810 is enhanced by or replaced by a ultraviolet light source configured to provide ultraviolet germicidal irradiation using short-wavelength ultraviolet (e.g., UV-C) light to kill or inactivate microorganisms. Any of the embodiments described herein can be modified to include an ultraviolet light source configured to provide for ultraviolet germicidal irradiation of air as the air passes through ductwork or other airway irradiated with the ultraviolet light.

FIG. 8 also shows a first local filter 812 included with the first VAV box 802, a second local filter 814 included with the second VAV box 804, a third local filter 816 included with the third VAV box 806, and a fourth local filter 818 included with the fourth VAV box 808. The first local filter 812 is located such that any indoor air passing into the first VAV box 802 via an induced air inlet of the first VAV box 802 passes through the first local filter 812. The second local filter 814 is located such that any indoor air passing into the second VAV box 804 via an induced air inlet of the second VAV box 804 passes through the second local filter 814. The third local filter 816 is located such that any indoor air passing into the third VAV box 806 via an induced air inlet of the third VAV box 806 passes through the third local filter 816. The fourth local filter 818 is located such that any indoor air passing into the fourth VAV box 808 via an induced air inlet of the fourth VAV box 808 passes through the fourth local filter 818.

The local filters 812, 814, 816, 818 are configured to filter airborne pathogens and other particulate pollutants from air being recycled through the VAV boxes 802, 804, 806, 806. As shown in FIG. 8, the local filters 812, 814, 816, 818 may be positioned upstream of the respective fans within the VAV boxes 802, 804, 806, 808. Alternatively, one or more of the local filters 812, 814, 816, 818 may be positioned downstream of the respective fans within the VAV boxes 802, 804, 806, 808. The local filters 812, 814, 816, 818 may be positioned in parallel with the dampers within the VAV boxes 802, 804, 806, 808 such that airflow through a given VAV box passes through either the filter or the damper, but not both. Alternatively, the local filters 812, 814, 816, 818 within the VAV boxes 802, 804, 806, 808 may be positioned in series with the dampers (e.g., downstream of the point at which the supply air from the AHU 302 mixes with the recycled air from the building space within the VAV box) such that the supply air from the AHU 302 passes through both the damper and the filter within the VAV box.

The local filters 812, 814, 816, 818 may be high-efficient particulate air (HEPA) filters, for example removing at least 99.97% of particles having diameters of 0.3 microns from the air passing through the local filters 812, 814, 816, 818, and improving in performances for other diameters. In some embodiments, the local filters 812, 814, 816, 818 are configured to remove approximately 95% of airborne particles having a most penetrating particle size for the filters, for example around 0.3 microns, which may correspond to the filtration efficiency of medical-grade respirator masks (e.g., N-95 rated). Filters of various materials, fiber diameters, thicknesses, porosities, etc. can be used to achieve these levels of filtration while also allowing for sufficient airflow through the local filters 812, 814, 816, 818. In some embodiments, the local filters 812, 814, 816, 818 are specifically adapted to capture and/or neutralize (kill, disable, render harmless) airborne pathogens. For example, copper or other conductive materials may be included which are known to destroy viruses or other pathogens which are trapped in contact with such surfaces. In some embodiments, the local filters 812, 814, 816, 818 are electrostatic filters, for example each having a set of charged wires that ionize particles in the air and a set of collector plates (surfaces, etc.) which are charged to attract the ionized particles, thereby providing a high level of air cleaning. Electrostatic filters may be wired to draw power provided to the VAV boxes, for example so that a fan and an electrostatic filter of a VAV box are on a shared circuit. An electrostatic filter may advantageously provide a relatively-low pressure drop across the filter (e.g., as compared to non-powered filters) which may reduce load on the fan of the VAV box while still providing a high level of air cleaning.

Various designs are possible in various embodiments of the local filters 812, 814, 816, 818. In order to provide sufficient airflow through the local filters 812, 814, 816, 818, the fans included with the VAV boxes can be sized appropriately (e.g., blade size, motor capacity) to provide higher power, fan speeds, maximum airflow capacity, etc. as compared to fans in conventional powered VAV boxes. In some embodiments, the fans are squirrel cage fans (squirrel cage blowers). In other embodiments, the fans are axial fans.

In some embodiments, the local filters 812, 814, 816, 818 are enhanced by or replaced by ultraviolet light sources configured to provide ultraviolet germicidal irradiation using short-wavelength ultraviolet (e.g., UV-C) light to kill or inactivate microorganisms. Any of the embodiments described herein can be modified to include an ultraviolet light source configured to provide for ultraviolet germicidal irradiation of air as the air passes through ductwork or other airway irradiated with the ultraviolet light. For example, a ultraviolet light and a local filter could be arranged in series in a duct such that the ultraviolet light kills or inactivates airborne pathogens before the remains of such pathogens are captured by the local filter (or vice versa, where the ultraviolet light acts as a back-up to the filter by killing any pathogens that manage to slip through the filter). As another example, the ultraviolet light may be provided inside one or more of the VAV boxes 802, 804, 806, 808, for example to kill any pathogens in a VAV box. In additional to media filters, electrostatic filters, ultraviolet irradiation tunnels (regions, structures, etc.), etc., various other air cleaning devices may be provided locally at the VAV boxes 802, 804, 806, 808 in addition to or in place of filters 812, 814, 816, 818 in various embodiments.

The HVAC system 800 is thus configured such that any air being output from the VAV boxes 802, 804, 806, 808 has passed through either the AHU filter 810 or one of the local filters 812, 814, 816, 818 (or other air cleaning device in various embodiments). Accordingly, the air returned to the space by the HVAC system 800 has had a high percentage of particulates filtered out (e.g., 95% or more) such that the air supplied to Spaces A, B, and C from the HVAC system 800 has significantly less pathogens and/or other particulates as compared to the air taken in from the space. The HVAC system 800 can thus operate over time to manage (improve, etc.) the air quality in the spaces by cycling relatively-contaminated indoor air through the AHU filter 810 or the local filters 812, 814, 816, 818. The HVAC system 800 is therefore configured to reduce risks to building occupants associated with respiration of air in the spaces served by the HAVC system 800.

Figure 9:
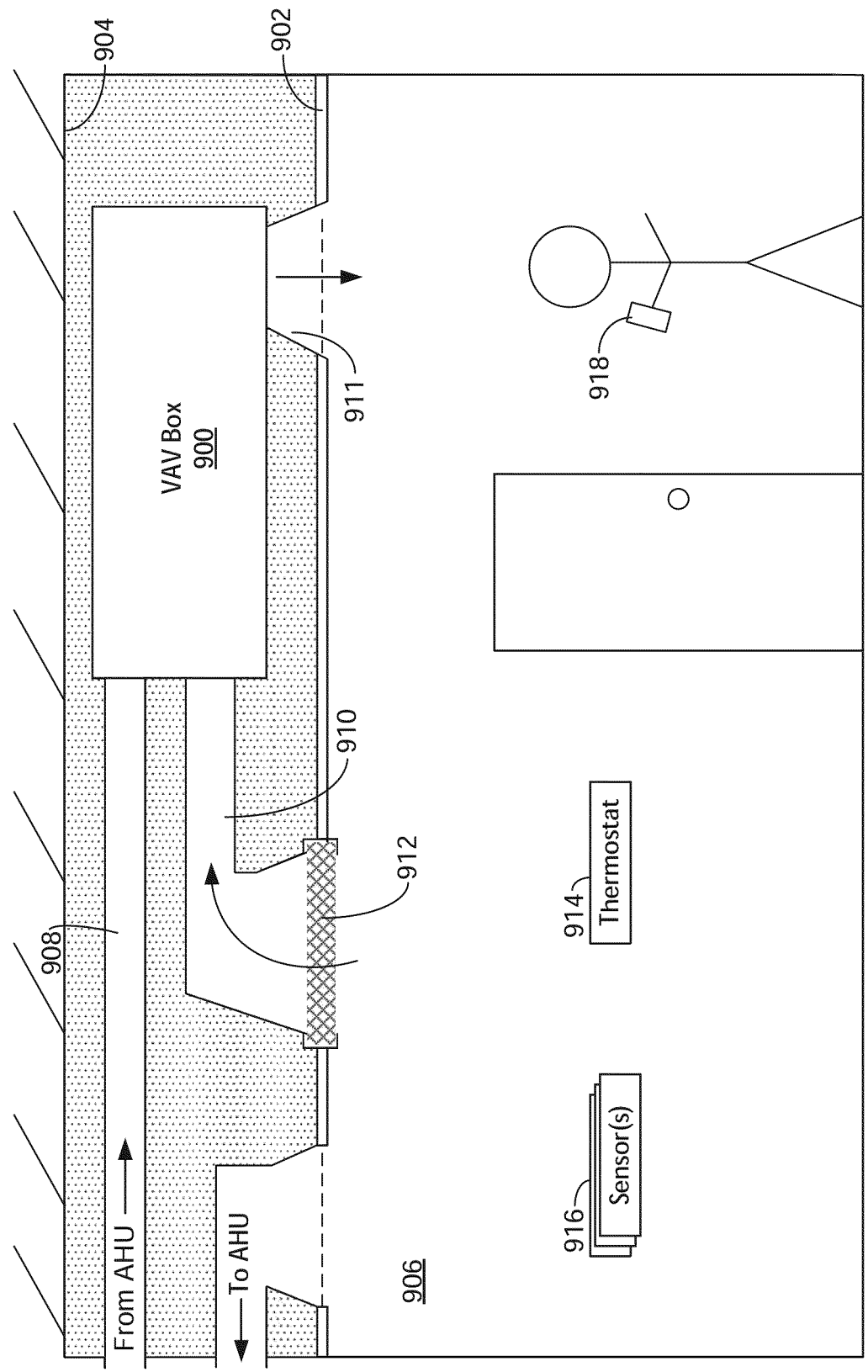
FIG. 9 is an illustration of placement of a filter and other components of a VAV box system with enhanced filtration relative to a building space, according to some embodiments.

Referring now to FIG. 9, a diagram of a space served by the HVAC system 800 is shown, according to an exemplary embodiment. For example, FIG. 9 may show Space B or Space C of FIG. 8.

As shown in FIG. 9, a VAV box 900 can be positioned between a drop (e.g., faux, false, etc.) ceiling 902 and an actual ceiling 904 of a building space 906. The VAV box 900 can be connected to an AHU via ductwork 908, so that VAV box 900 can receive conditioned, filtered supply air from the AHU. The VAV box 900 is connected to the building space 906 via induced air inlet ductwork 910 to receive air from the building space 906 for recycling through the VAV box 900. The VAV box 900 is also connected to the building space 906 via a unit discharge vent 911 through which the VAV box 900 outputs filtered supply air to the building space 906.

FIG. 9 shows local filter 912 is positioned at the induced air inlet ductwork 910 to filter air flowing into the VAV box 900 from the space 906. In particular, in the example of FIG. 9, the local filter 912 is positioned at or proximate the drop ceiling 902 such that the local filter 912 can easily be accessed from within the space 906 and without a need to access the plenum between the drop ceiling 902 and the actual ceiling 904. For example, the local filter 912 can be positioned immediately behind a grille or grate which covers an opening in the drop ceiling 902 for the induced air inlet ductwork 910. This enables the local filter 912 to be installed, removed, discarded or cleaned, and replaced by a person in the space without requiring specialty expertise in accessing building plenums and without requiring dismantling of the drop ceiling or other invasive actions. The local filter 912 is shown as having a substantially planar form which is positioned to be approximately parallel to and approximately aligned with a plane defined by the drop ceiling 902.

In alternative embodiments, the local filter 912 can be placed at the unit discharge vent 911, for example at a position substantially aligned with the drop ceiling 902 to enable easy access, installation, removal, and replacement as described above. In some cases, a filter is provided both at the air inlet ductwork 910 and the unit discharge vent 911. In such cases, the air discharged into the space has been filtered twice, including by the filter at the unit discharge vent 911 and by a local filter 912 at the air inlet ductwork 910 or by a filter in the AHU (e.g., filter 810). Although the local filter 912 is shown located outside the perimeter of the VAV box 900 in FIG. 9, it should be understood that the VAV box 900 may include the local filter 912 as a component of the VAV box 900. As used herein, the term "VAV box" may denote not only the components bounded by the housing of the VAV box 900 which may contain the airflow damper and the fan, but also any auxiliary components which may be located outside the perimeter of the physical box 900. For example, the local filter 912, the air inlet ductwork 910, the unit discharge vent 911, or other components shown in FIG. 9 in the proximity of the VAV box 900 may be considered components of the VAV box 900 even if they are not contained within the perimeter or housing of the VAV box 900.

FIG. 9 also shows that the building space includes a thermostat 914 and one or more sensors 916. The thermostat 914 may be configured to obtain a temperature setpoint for the space and communicate with controllers for the VAV box 900 and the AHU (e.g., via a building management system) to facilitate operation of the AHU and the VAV box 900 to drive an indoor air temperature to the temperature setpoint. The thermostat 914 may be configured to accept various user inputs (e.g., via buttons, touchscreen, etc.). In some embodiments, the thermostat is enabled with artificial intelligence and/or model-based predictive control algorithms to automatically generate temperature setpoints or other setpoints for the space.

The one or more sensors 916 can include one or more temperature sensors, humidity sensors, carbon dioxide sensors, carbon monoxide sensors, smoke detectors, occupancy sensors, motion sensors, cameras, access control devices, security system sensors, etc. to measure conditions of the building space. In some embodiments, the one or more sensors include particulate matter sensors, for example a PM2.5 sensor, configured to directly measure a density of particulate matter in the indoor air. In some embodiments, a sensor configured to directly detect airborne pathogens is included. In some embodiments, the sensors 916 include one or more sensors configured to measure body temperatures of people in the space (e.g., infrared-based sensors). Various sensors configured to provide data indicative of current environmental activity, current pollution or air quality levels, current infection risk, or current information relating to occupant activity and health in a space are included in various embodiments.

FIG. 9 also shows a user device 918 associated with a person in the space. In some cases, the user device 918 is associated with an occupant/user of the space, and the user device 918 can be used to communicate with a BMS to change temperature setpoints, change control modes, etc. for equipment that serves the space. In some cases, the user device 918 is associated with a building manager or maintenance technician and is configured to receive alerts from the VAV box 900 and/or a BMS. For example, the BMS may be configured to push notifications to the user device 918 to alert the technician that the local filter 912 should be replaced or cleaned (e.g., due to a lifespan of local filter 912, in response to automatic detection of the local filter 912 reaching its particle retention capacity). The user device 918 may be enabled to provide navigational guidance to direct the user to the particular space and the particular point in the space associated with the local filter 912 to be changed.

Figure 10:
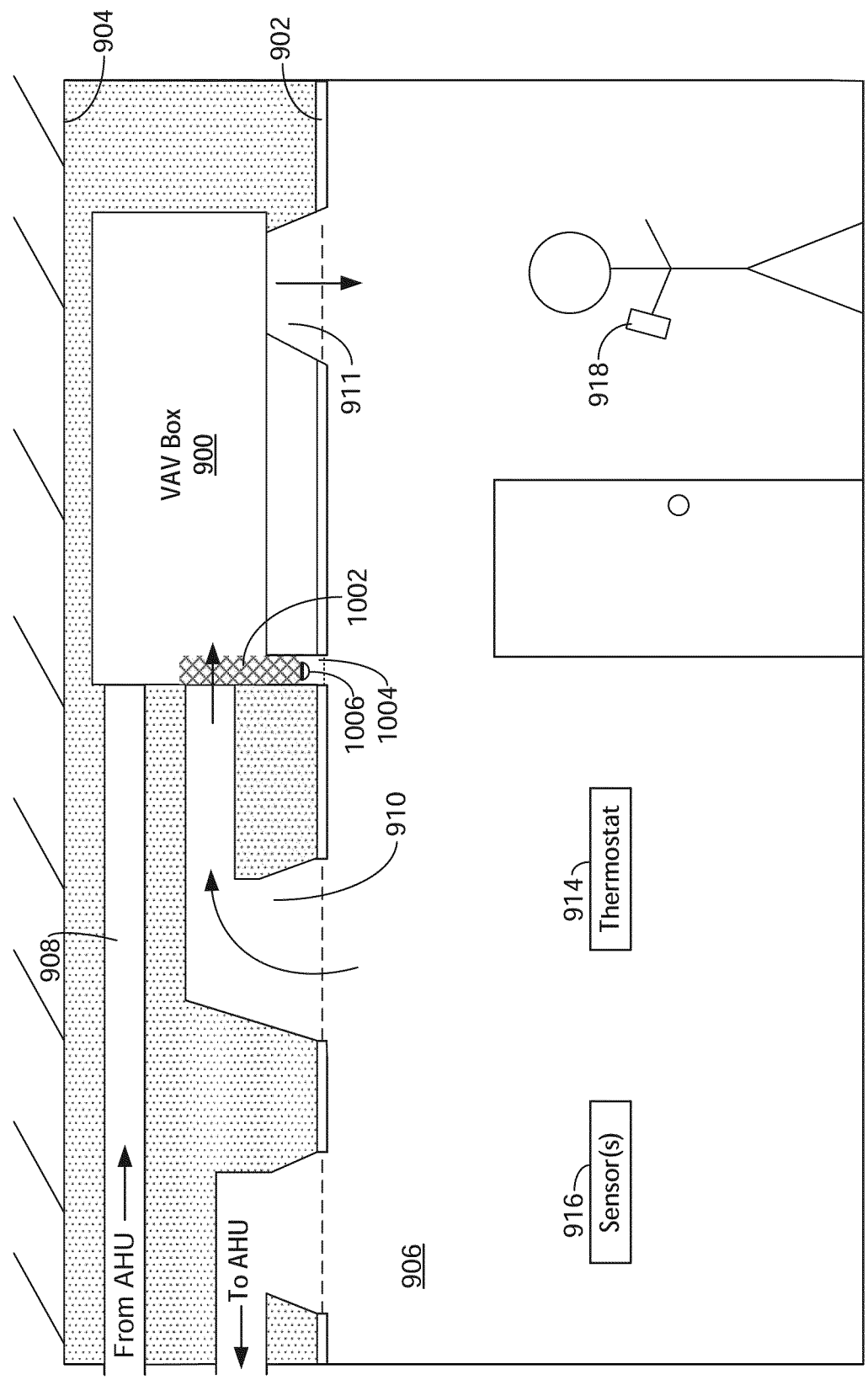
FIG. 10 is another illustration of placement of a filter and other components of a VAV box system with enhanced filtration relative to a building space, according to some embodiments

Referring now to FIG. 10, another embodiment of a space 906 equipped with the VAV box 900 is shown, according to an exemplary embodiment. The embodiment of FIG. 10 differs from the embodiment of FIG. 9 in the placement of the local filter. In particular, FIG. 10 shows a local filter 1002 positioned in or at the VAV box 900 where the induced air inlet ductwork 910 meets the VAV box 900. The local filter 1002 is oriented vertically, i.e., perpendicular to the drop ceiling 902. An opening (slot, channel) 1004 through the drop ceiling allows the local filter 1002 to be inserted into or removed from the VAV box 900 without requiring a technician to access the plenum between the drop ceiling 902 and the actual ceiling 904. In various embodiments, no ceiling tiles need to be disturbed to replace the filter 1002. In other embodiments, a single ceiling tile can be moved to access and replace the filter 1002. A handle or latching mechanism 1006 can be included to hold the filter 1002 in position once installed and to facilitate handling of the filter 1002. Electrical contacts may be provided at the opening 1004 to connect the filter 1002 to a source of electricity in embodiments where the filter 1002 is an electrostatic filter.

In some embodiments, the arrangement of FIG. 10 may allow for selective installation of local filters that extend across one or both the air inlet ductwork 910 and the ductwork 908 through which air is suppled from the AHU to the VAV box 900. For example, the filter 1002 may be inserted into the opening 1004 at a first depth such that the filter 1002 covers only the AHU ductwork 908 and not the air inlet ductwork 910 (i.e., to filter only the AHU air stream), at a second depth such that the filter 1002 covers both the AHU ductwork 908 and the air inlet ductwork 910 (i.e., to filter both airstreams), or at a third depth such that the filter 1002 covers only the air inlet ductwork 910 and not the AHU ductwork 908 (i.e., to filter only the air inlet airstream). The depth at which the filter is inserted can be controlled manually by the filter installer and/or can be automatically adjusted by a controller. For example, the filter 1002 may be coupled to an actuator that operates to automatically move the filter 1002 in response to a control signal received from a controller without requiring manual adjustment. In such embodiments, filtered air from the AHU could be re-filtered for further purification by the local filter 1002 when desired (e.g., during times of high pathogen-related risks such as during disease outbreaks) and the double-filter of such air can be removed when not desired (e.g., when infection risks are low). This may allow for customizability of the level of filtration across different times.

Referring generally to FIGS. 9 and 10, additional hardware features can be included in some embodiments. For example, in some embodiments an automatic filter changing mechanism can be included. For example, a repository of new/clean filters can be stored in the building plenum, as can a collection of dirty/used filters. A robotic mechanism (e.g., similar to an automated multi-record player or automated compact disk changer) can be configured to remove used local filters from the positions shown in FIGS. 9-10 and replace them with new filters from the repository. Such an arrangement would minimize the number of times a technician needs to be deployed to the space to manually change filters. An added benefit may include reduced risk of pathogen infection over time as the discarded filters remain out of human contact for a time period after being removed from service during which any pathogens trapped in the filter become dormant, die, are destroyed, etc.

As another example, a filter sterilization system may be included in the plenum, for example at the mount for the local filter 912 or 1002. For example, a ultra-violet lighting system may be included and may be configured to expose the filter to ultra-violet light configured to neutralize any active pathogens that may be retained in the local filter. Treatment of the filter under ultra-violet light just before the time of filter removal may reduce exposure risks for a technician tasked with removing and replacing the filter.

Although ultra-violet treatment may be detrimental to continued filter performance, such deterrents are not relevant if the filter is replaced shortly after UV treatment. Notifications can be pushed to a technician (e.g., via user device 918) at the time of treatment to facilitate replacement of a filter shortly thereafter. Other treatments (e.g., chemical treatments with disinfectants) can also be used.

Control Approaches for VAV Boxes with Enhanced Filtration

Figure 11:
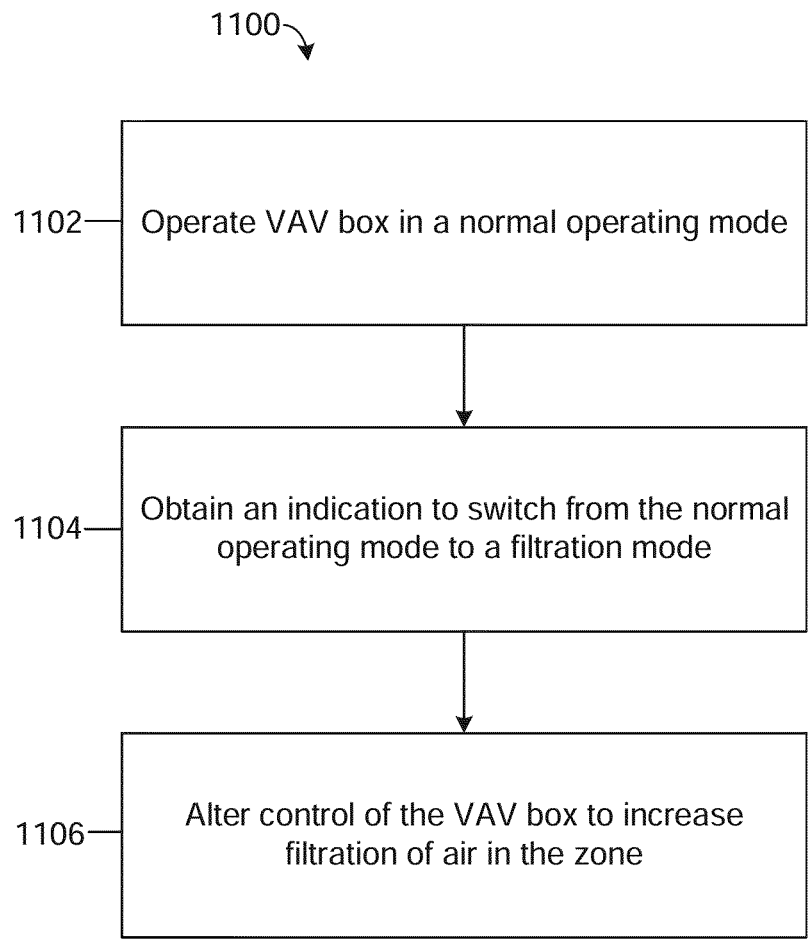
FIG. 11 is a flowchart of a process for operating a VAV box to increase filtration of air in the zone according to a mode-based control scheme, according to some embodiments.

Referring now to FIG. 11, a flowchart of a process 1100 for operating a VAV box is shown, according to an exemplary embodiment. The process 1100 can be executed by any of the various embodiments of HVAC systems with VAV boxes described above. The process 1100 relates to selecting an operating mode and performing an automated filter-related activity in response to selecting the operating mode. In some embodiments, the process 1100 can include any of the methods, steps, control logic, or other features described in U.S. Provisional Patent Application No. 63/050,465, filed Jul. 10, 2020, and U.S. patent application Ser. No. 17/013,273, filed Sep. 4, 2020, the entire disclosures of which are incorporated by reference herein.

Figure 12:
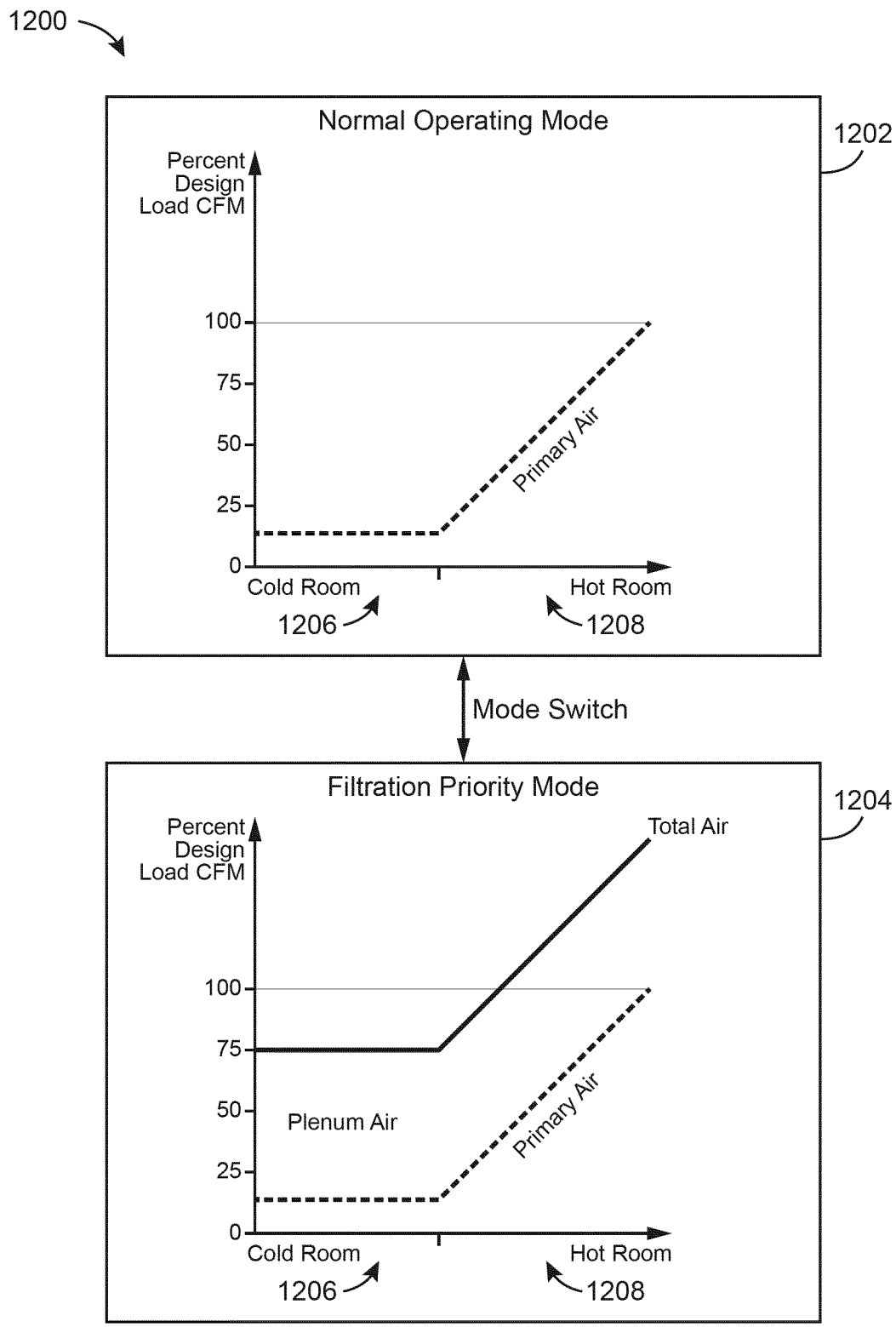
FIG. 12 is an illustration of control schemes for a VAV box in different modes, according to some embodiments.

At step 1102, a VAV box is operated in a normal operating mode. The normal operating mode may correspond to conventional or standard control strategy for a VAV box, for example in which temperature of the space is prioritized. For example, in the normal operating mode, the airflow provided by the VAV box may be at a minimum (e.g., near zero) when the temperature in the space is at or near the setpoint. Accordingly, in some low-load situations (e.g., seasons/climates where outdoor air temperature is close to an indoor temperature setpoint) the airflow provided by the VAV box in the normal operating mode may be relatively low and, as such, relatively little air may be filtered by the HVAC system. A graphical representation of a normal operating mode is shown in FIG. 12 and described below with reference thereto.

At step 1104, an indication to switch from the normal operating mode to a filtration mode is obtained. In some embodiments, the indication is a user request (e.g., via thermostat, via a BMS, via user device 918) to enter the filtration mode. In other embodiments, the indication to switch from the normal operating mode to the filtration mode is automatically created or generated. For example, in some embodiments the indication is generated based on data from the sensors 918 based on an occupancy of the space, a measured trait of a person in the space (e.g., detection of a person in the space with a fever), or some other calculation or metric. For example, a control system for the building or space may be configured to generate an estimated infection probability (e.g., a percentage, a relative likelihood, high, medium, low, etc.) based on any of a variety of factors and the estimated infection probability could be compared to a threshold over which the filtration mode would be activated. Various exemplary systems and methods for estimating infection risk or infection probability are described in detail in U.S. patent application Ser. No. 16/927,759, filed Jun. 13, 2020, the entire disclosure of which is incorporated by reference herein. Any of the techniques described in U.S. patent application Ser. No. 16/927,759 can be used in process 1100 to estimate the infection probability.

At step 1106, the VAV box is controlled in the filtration mode to increase filtration of air in the zone. Controlling the VAV box to increase filtration can include increasing the operating speed of the local fan, thereby increasing the amount of air that is forced through the local filter at the VAV box. An example control strategy in the filtration mode is illustrated in FIG. 12 and described with reference thereto. In some examples, the filtration mode may prioritize improving air quality (e.g., reducing infection probability, reducing measured or estimated levels of airborne pathogens or contaminants, etc.) over adherence to a temperature setpoint, a humidity setpoint, airspeed levels, or energy costs associated with operating the fan.

FIG. 11 shows a switch from a normal operating mode to a filtration operating mode. The present disclosure also contemplates switching back from the filtration operating mode to the normal operating mode, for example when a trigger condition which was used to automatically initiate the filtration operating mode is no longer satisfied, or in response to a user request to switch modes. For example, the filtration operating mode may be provided only when a space is occupied, for example so that a fan in the VAV box is only operated when the space is occupied. VAV box systems can be controlled to repeatedly alternate between the normal operating mode and the filtration operation mode over time to adjust for changing conditions and utilization of spaces.

Referring now to FIG. 12, an illustration 1200 depicting a possible change in control logic and VAV box behavior associated with switching between a normal operating mode and a filtration operating mode, according to an exemplary embodiment. The illustration 1200 includes a first frame 1202 which corresponds to the normal operating mode and includes a graphical representation of VAV box behavior resulting from control under the normal operating mode. The illustration 1200 also includes a second frame 1204 which corresponds to the filtration operating mode and includes a graphical representation of VAV box behavior resulting from control under the filtration operating mode. The examples of FIG. 12 may relate to an embodiment using a series flow VAV box as in FIG. 7, parallel flow VAV boxes as in FIG. 6, or a combination thereof. The "total air" line in FIG. 12 denotes the total airflow out of the VAV box, which is a sum of the primary air received at the VAV box from the AHU and the plenum air draw into the VAV box from the building space. In a series embodiment, the plenum air and primary air may combine within the VAV box, whereas in a parallel embodiment, the plenum air and primary air may be separate airflows that exit the VAV box separately. The example shown relates to a cooling mode for the HVAC system. However, the text "hot room" and "cold room" in FIG. 12 along with the temperature descriptions provided below (e.g., hotter vs. colder, temperature increases vs. temperature decreases, temperature above vs. temperature below, heating vs. cooling, etc.) can be swapped for an embodiment in which the HVAC system operates in a heating mode.

Under the normal operating mode as shown in frame 1202, the fan is off and the total airflow out of the VAV box is made up entirely of primary air. Accordingly, the position of the damper is adjusted to let more or less cold air into the room in order to affect the temperature of the room. For example, the primary airflow is at a low, constant rate in a first temperature range 1206, and increases when indoor air temperature increases in a second temperature range (e.g., above a temperature setpoint). The damper of the VAV box can be controlled to cause this change in primary airflow. Not running the fan of the VAV box saves power in the normal operating mode. However, because the fan is not running, filtration of air through the local filter for the VAV box may be relatively low in the normal operating mode.

After a mode switch, a filtration priority mode may be engaged as illustrated in the second frame 1204. As in the normal operating mode, the primary air flow is relatively low when the zone is colder than a setpoint (temperature range 1206) and increases as the zone gets hotter (temperature range 1208). However, in the filtration priority mode, the amount of plenum air flow is also controlled to increase as the amount of primary air increases. This can be done to maintain or nearly maintain at least a threshold amount of plenum air being recirculated through the VAV box and the local filter at any given time. For example, FIG. 12 illustrates that the plenum air flow can be increased even where doing so moves the total airflow through the VAV box above a design load limit for the AHU or for the room. In some cases, the airflow may be increased beyond what is considered comfortable for occupants of the space. However, the increased flow of filtered air may be perceived as beneficial and comfortable in cases where the filtration priority mode is needed. The airflow plotted in the second frame 1204 of the illustration of FIG. 12 may be achieved by providing the VAV box with a more powerful fan than would be required if only the normal operating mode were a possible control modality, and by increasing the fan speed/power as the need for primary air also increases. Temperature control and enhanced filtration can thus be simultaneously provided.

In other embodiments of the normal operating mode, the total air flow is constant at all times and under any indoor air temperature. The primary air (i.e., the conditioned supply air from the AHU) is provided at a low flow rate when the space is at or below a temperature setpoint (shown as temperature range 1206). This can be achieved by moving the damper within the VAV box to a position where it is nearly closed and only lets a small flow of supply air into the VAV box. When the space is at or below the temperature setpoint, the fan of the VAV box is operated at a constant level, so that indoor air (plenum air) is recycled through the VAV box at a constant rate to provide a total air flow equal to the sum of the primary air flow and the plenum air flow as illustrated in FIG. 12. As zone temperature increases above a setpoint and cooling is required at the space (shown as temperature range 1208), the damper is opened to allow more cold, primary air into the VAV box. To maintain constant total airflow, the amount of plenum air recycled through the VAV box decreases proportionally. For example, the speed of the local fan within the VAV can be decreased as the amount of primary air increases to reduce the amount of recycled air pushed through the VAV box and maintain the total airflow through the VAV box at a relatively constant level. At hotter zone temperatures, more primary air is required so that more cooling is supplied to the zone. Airflow through the local filter is thus controlled to zero or near zero at high zone temperatures as illustrated in the first frame 1202. This may limit the ability of the local filter to provide filtration for the space. For example, the total amount of filtration may be limited by the maximum airflow that can be received from the AHU. However, in the normal operating mode, filtration is not a primary focus and so any reduction in filtration may be outside the factors used by the controller.

Figure 13:
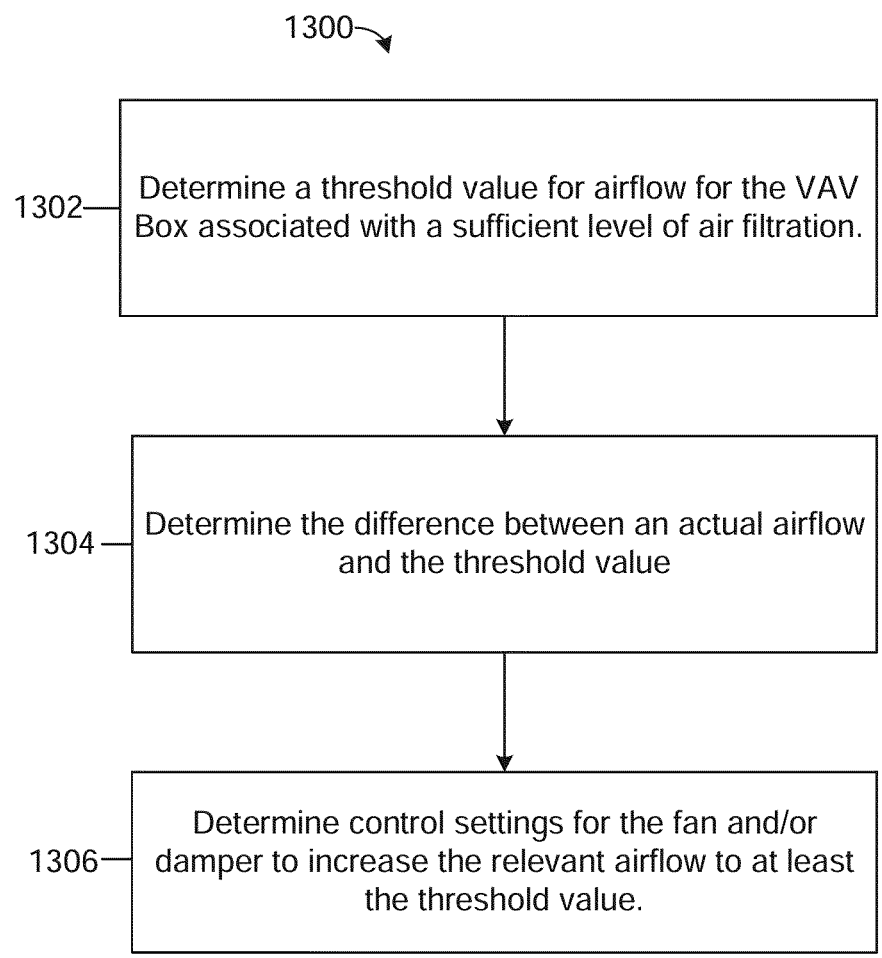
FIG. 13 is a flowchart of a process for operating a VAV box to achieve at least a sufficient level of air filtration, according to some embodiments.
Figure 14:
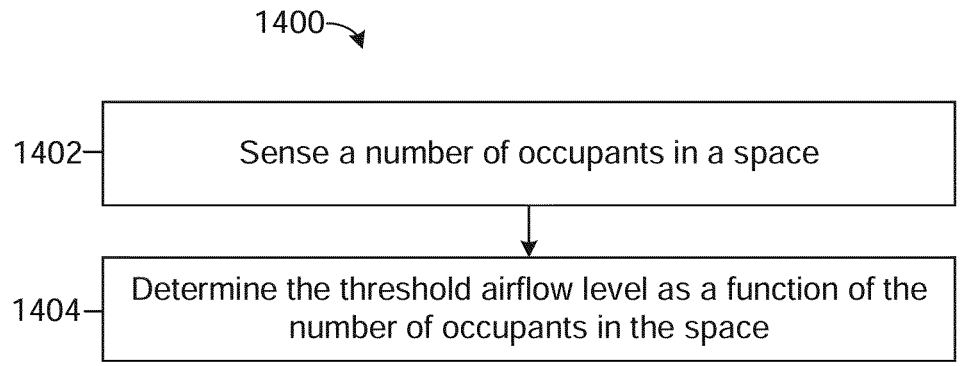
FIG. 14 is a flowchart of a first process for determining a threshold airflow level for use in the process of FIG. 13, according to some embodiments.
Figure 15:
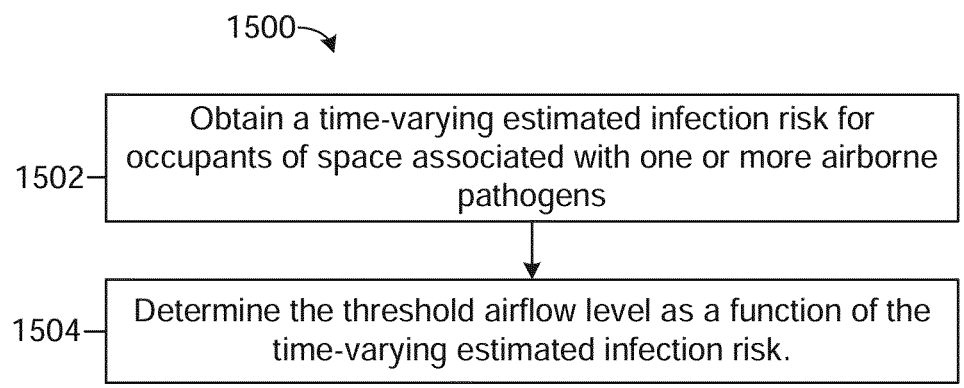
FIG. 15 is a flowchart of a second process for determining a threshold airflow level for use in the process of FIG. 13, according to some embodiments.
Figure 16:
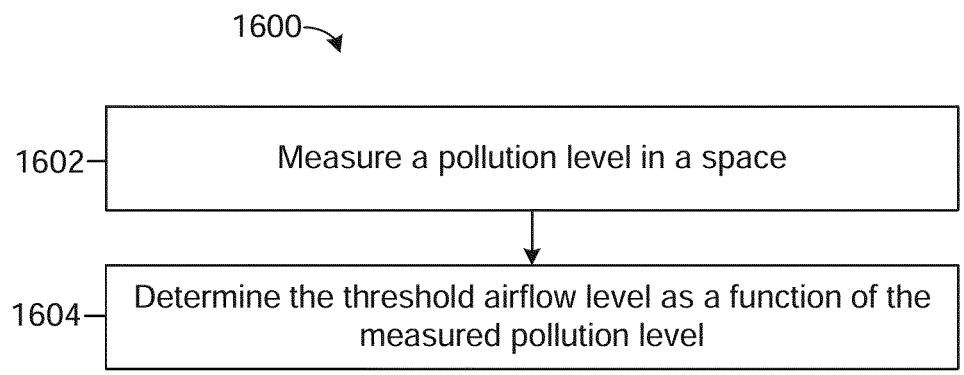
FIG. 16 is a flowchart of a third process for determining a threshold airflow level for use in the process of FIG. 13, according to some embodiments.

Referring now to FIG. 13, a flowchart of a process 1300 for controlling a VAV box in a filtration priority mode is shown, according to an exemplary embodiment. At step 1302, a threshold value for airflow for the VAV box associated with a sufficient level of air filtration is determined. The threshold value may be for an amount of plenum recycled airflow, an amount of primary airflow, or a total amount of airflow (i.e., a sum of both recycled air and primary air). The threshold can be determined in various ways for example as shown in FIGS. 14-16 and described with reference thereto below. The threshold value may be determined as a value at which a sufficient level of filtration is provided because it corresponds to a sufficient amount of air in the space being made up of recently-filtered air.

At step 1304, a difference between the actual airflow and the threshold value. For example, a measured total airflow can be compared to a threshold value. As another example, a control input (e.g., fan speed) can be used as a proxy for an amount of airflow and compared to a threshold value. Step 1304 can included determining whether the actual airflow is less than or greater than the threshold value, and, in some cases, determining a magnitude of the difference between the actual airflow and the threshold value.

At step 1306, control settings for the fan and/or damper are determined to increase the relevant airflow to at least the threshold value. Step 1306 can include accounting for effects on zone temperature and/or supply air temperature associated with adjusting the fan speed or damper positions. Various control algorithms can be used in step 1306 including, for example, feedback control, model predictive control, extremum seeking control, or any of a variety of control methodologies that allow for the relevant airflow to be controlled to at least the threshold value. Step 1306 may result in control of the fan and/or damper to drive the relevant airflow (e.g., primary airflow, recycled airflow, total airflow) to at least the threshold value. In other embodiments, a target (setpoint) airflow is used instead of a minimum threshold value for airflow, such that a controller can decrease airflow if a measured airflow exceeds the target.

Referring now to FIG. 14, a first process 1400 for determining the threshold airflow level for use in process 1300 is shown, according to an exemplary embodiment. At step 1402, a number of occupants in the space is sensed. For example, an occupancy sensor is used. As another example, a carbon dioxide sensor is used to approximate the number of occupants based on a change in carbon dioxide levels in the air as occupants exhale carbon dioxide. As another example, an access control system is used to determine how many people have enter a space (e.g., how many people have used credentials to enter a space). Various methods for determine a real-time number of occupants in the space are possible.

At step 1404, the threshold airflow for the VAV box is determined as a function of the number of occupants. In some embodiments, for example, the threshold airflow is determined as a multiple of occupancy or as a polynomial using occupancy as a variable (E.g., a square or cube of occupancy). In other embodiments, a non-linear function or other modeling approach is used to map occupancy to threshold air flow. The threshold airflow can thus be increased to track risks associated with spreading of contagious airborne pathogens which increase with occupancy.

Referring now to FIG. 15, a second process 1600 for determining the threshold airflow level for use in process 1300 is shown, according to an exemplary embodiment. At step 1502, a time-varying estimated infection risk for occupants of the space associated with one or more airborne pathogens is determined. Such a risk (or probability) can be determined using approaches described in U.S. patent application Ser. No. 16/927,759, filed Jun. 13, 2020, the entire disclosure of which is incorporated by reference herein.

At step 1504, the threshold airflow level can be determined as a function of the estimated infection risk. The threshold airflow level will preferably monotonically increase as estimated infection risk increases, although other functions are possible. As the threshold airflow level is implemented in process 1300, more filtration will then be provided as the estimated infection risk goes up, with energy costs and potential occupant discomfort associated with filtration decreasing when estimated infection risks go down.

Referring now to FIG. 16, a third process 1600 for determining the threshold airflow level for use in process 1300 is shown, according to an exemplary embodiment. At step 1602, a pollution level in the space is measured. For example, a pollution level can be directly measured using a particulate matter sensor that can measure a density of particulates in the air in the space. As another example, a pollution level could be directly measured using a sensor configured to directly detect the presence of airborne pathogens in a space. As another example, a pollution level could be determined based on the presence of a pollution source, for example by detecting a person having a fever in the space and using infrared cameras or other technology to track and quantify potential shedding of pathogens by such a person.

At step 1604, the threshold airflow level is determined as a function of the measured pollution level. The threshold airflow level will preferably monotonically increase as measured pollution level increases, although other functions are possible. As the threshold airflow level is implemented in process 1300, more filtration will then be provided as the pollution level goes up, with energy costs and potential occupant discomfort associated with filtration decreasing when pollution level goes down.

Various combinations of these approaches for determining threshold airflow levels are possible. For example, a threshold or target airflow level can be determined as a function of occupancy, measured pollution, and/or estimated infection risk. In some embodiments, one or more of these factors can be used concurrently to increase or decrease the threshold airflow level. For example, the output of each of processes 1400-1600 may be provided as an amount by which to increase or decrease the threshold airflow level. The outputs of processes 1400-1600 can be combined (e.g., summed, averaged, aggregated, etc.) to generate a total amount by which to increase or decrease the threshold or an average value for the threshold.

Figure 17:
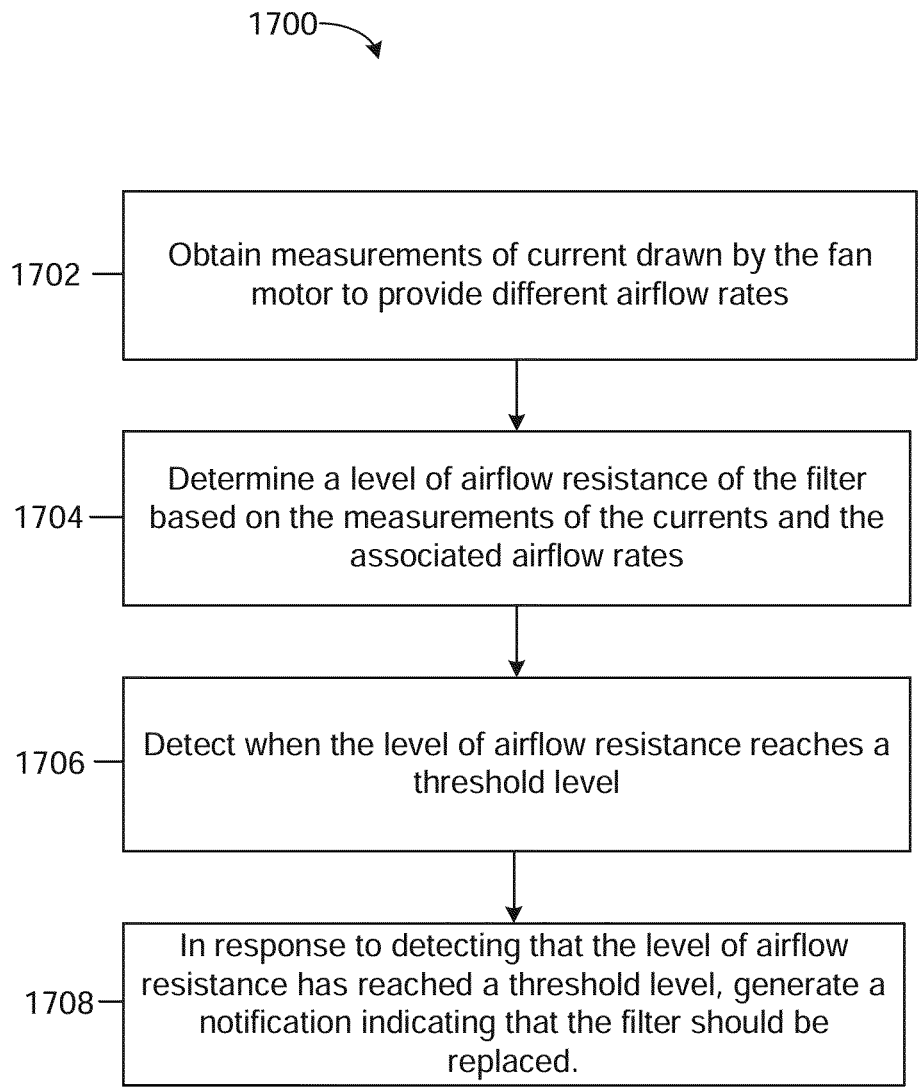
FIG. 17 is a flowchart of a process for generating a notification when a filter should be replaced, according to some embodiments.

Referring now to FIG. 17, a flowchart of a process 1700 for automatically determining when to change a local filter at a VAV box is shown, according to an exemplary embodiment. The process 1700 can be performed by a VAV controller or using computing resources from a BMS computing system, and based on data measured/collected at the motor of the fan of the VAV box.

At step 1702, measurements of current drawn by the fan motor to provide different airflow rates are obtained. For example, the fan may be controlled to achieve different airflow rates or fan speeds (e.g., via feedback control based on an airflow setpoint). Due to the local filter collecting particles over time and become more clogged, the resistance on air movement through the filter and the VAV box increases. Accordingly higher fan powers will be required over time to push the same amount of air across the filter, and the motor for the fan will draw higher currents to achieve the same airflow rate as the filter retains more and more particles.

At step 1704, a level of airflow resistance of the filter based on the measurements of the currents and the associated airflow rates is determined. This can be a normalized metric used for monitoring filter lifespan. For example, a level of airflow resistance can be calculated using a derivative of the current relative to airflow rate. Various functions are possible.

At step 1706, the level of airflow resistance is detected as reaching a threshold level. The threshold level is associated with a retention capacity of the filter, such that the filter has captured as much particles as it can while remaining effective, and/or with a sufficiently energy-intensive fan operation so as to justify (e.g., offset) the cost of replacing the filter.

At step 1708, in response to detecting that the level of airflow resistance has reached a threshold level, a notification is generated indicating that the filter should be replaced (e.g., discarded and replaced with a new filter or cleaned for re-use). For example, the notification can be generated at a BMS and pushed to a user device (e.g., smartphone, laptop) to inform a maintenance person that the filter should be replaced. In some embodiments, the system is also controlled to take automatic action in response to determining that the filter should be replaced. For example, as discussed above, an automatic sterilization or cleaning process can be performed on the filter to be removed. As another example, an automatic process for removing and replacing the filter can be executed. As another example, in some embodiments it may be possible to clean the filter and return the filter for re-use, in which case a cleaning process may be performed using some automatic mechanism.

Figure 18:
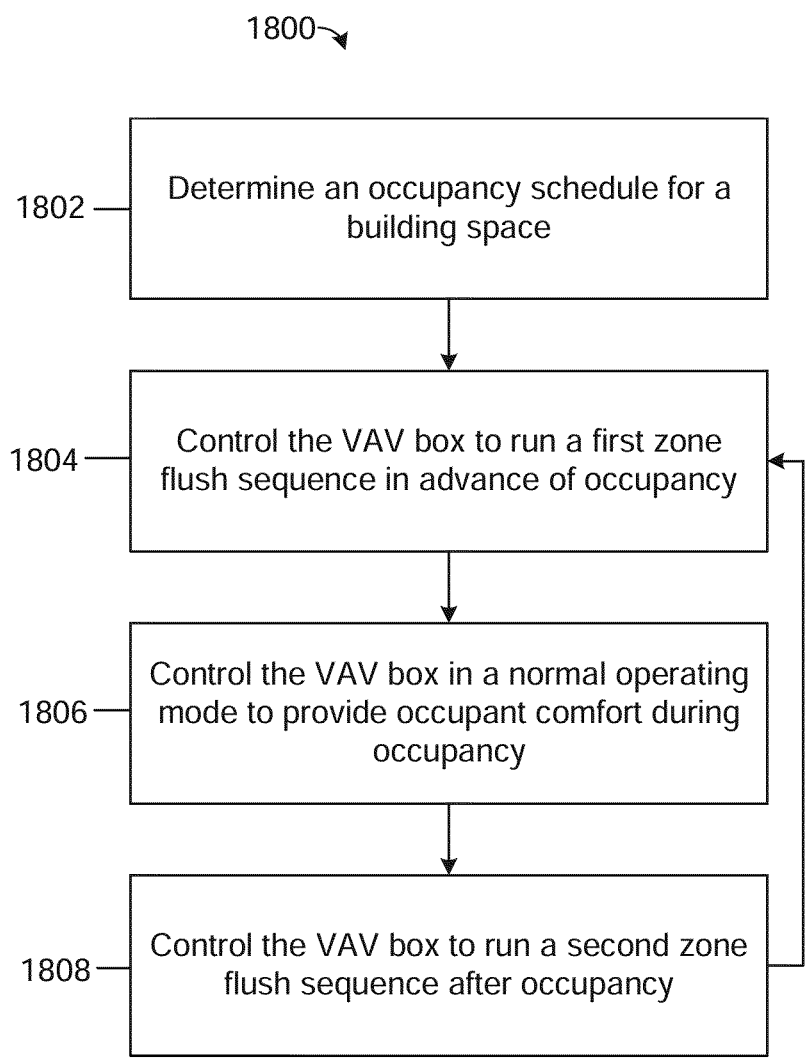
FIG. 18 is a flowchart of a process for control a VAV box to filter air before and/or after an expected occupation of a space, according to some embodiments.

Referring now to FIG. 18, a flowchart of a process 1800 for filtering zone air before and/or after occupancy of the space, according to an exemplary embodiment. The process 1800 can be executed by any of the various embodiments of HVAC systems with VAV boxes described above.

At step 1802, an occupancy schedule for a building space is determined. In some embodiments, the occupancy schedule is directly input by a user. In some embodiments, a controller for a VAV box is communicable with a scheduling system (e.g., room reservation system, calendaring system, appointment scheduling system) to obtain a schedule for when the building space is expected to be occupied. In some embodiments, step 1802 includes collecting historical occupancy data (e.g., from occupancy sensors in the building space) and learning (e.g., machine learning, artificial intelligence) an occupancy schedule based on the historical occupancy data and, in some cases, other relevant historical data. The occupancy schedule can include a time and duration of an expected occupation of the space, for example indicating that the space is expected to be occupied from 10:00 AM to 1:00 PM and from 4:00 PM to 7:00 PM. In various embodiments, periods of expected occupancy can range from minimum periods of 15 minutes, 1 hour, etc. to full days or weeks. Additionally, by determining expected occupations of the space, step 1802 can also be described as determining periods when the space is expected to be vacant.

At step 1804, the VAV box for the building space is controlled to run a first zone flush sequence in advance of an expected occupation of the building space. That is, based on the occupancy schedule, a time when the building space can be determined. The VAV box can be controlled to run a first zone flush sequence to be completed before the building space becomes occupied (e.g., just before, one hour before, two hours before). The zone flush sequence is configured to flush the air in the space through the VAV box and/or through an AHU to provide purification of the air. For example, the first zone flush sequence may be configured to cause at least a threshold portion (fraction, percentage) of the total air volume in the space to be recycled through the VAV box (e.g., 80%, 90%, etc.). This may require pushing a total amount of air through the VAV box that exceeds the total air volume in the space, as some air may recirculate through the VAV box multiple times during the first zone flush sequence.

The first zone flush sequence may include running the fan of the VAV box at a high or maximum fan speed to force a maximum amount of air through the local filter. Because the space is expected to be vacant (unoccupied) based on the occupancy schedule, the first zone flush sequence can be executed without regard to comfort (temperature setpoints, humidity, draftiness, etc.) in some examples. In some cases, the fan of the VAV box can be sized based on the demands of running the flush sequence in an unoccupied space, which may be satisfied by providing much more powerful fan than for conventional VAV boxes. By running the first zone flush sequence, the VAV box can filter a large percentage of the air in the space to prepare the space to be occupied.

At step 1806, when the first zone flush sequence is completed and the expected occupation of the building space begins (e.g., according to the determined occupancy schedule, based on sensed occupancy from sensor data), the VAV box is controlled to run in a normal operating mode to provide occupant comfort during occupancy. The normal operating mode can include operating the VAV box to drive the indoor air temperature in the building space to a temperature setpoint. The VAV box thus performs to provide comfortable conditions while the space is occupied, without exposing the occupants to conditions that could be caused by a zone flush sequence.

At step 1808, after occupancy (e.g., after occupancy sensors indicate that the space is unoccupied, after the end of an expected occupation based on the determined occupancy schedule), a second zone flush sequence can be provided by the VAV box. The second zone flush sequence is configured to clean the air that may have been compromised by the occupants. For example, when controlled to provide the second zone flush sequence, the VAV box may remove airborne pathogens from the space which were shed by occupants during the zone occupancy period. In some cases, the second zone flush sequence is the same as the first zone sequence described above with reference to step 1804. In other embodiments, the first and second zone flush sequences differ in duration, power, the portion (fraction, percentage, volume) of the total air volume filtered during the sequences, etc.

FIG. 18 shows the process 1800 iterating through the steps 1804, 1806, and 1808. In such cases, two zone flush sequences are provided between periods of occupancy. For example, the first zone flush sequence may be provided early in the morning before a space is to be occupied, and the second zone flush sequence may be provided in the evening after occupancy has concluded for a day. In other cases, only one zone flush sequence is provided between periods of occupancy, for example during a relatively-short mid-day gap between occupancy. Various embodiments are possible.

Accordingly, the systems and methods described herein provide various enhanced filtration capabilities for controlling airflow and filtration locally at a space using VAV box systems. Improved air quality can be provide, including by prioritizing filtration during times of high pollution or infectious disease outbreaks. Various hardware designs and control strategies for providing such advantageous filtration are described herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A variable air volume (VAV) box for a building HVAC system, the VAV box comprising:
   a fan operable to induce airflow from a building space through the VAV box and discharge the airflow back to the building space;
   an air cleaning device positioned to clean the airflow through the VAV box before discharging the airflow back to the building space and configured to affect an air quality of the airflow by cleaning the airflow through the VAV box; and
   a controller configured to operate the fan to control the airflow through the VAV box to achieve a target for the air quality of at least one of the airflow discharged from the VAV box or air within the building space.

2. The VAV box of claim 1, further comprising a damper operable to modulate a second airflow through the VAV box, the second airflow received from an air handling unit that provides airflow to the VAV box;
wherein the controller is configured to operate both the fan and the damper to adjust a first amount of the airflow induced by the fan and a second amount of the second airflow received from the air handling unit to achieve the target for the air quality.

3. The VAV box of claim 1, wherein the controller is located within the VAV box or physically coupled to the VAV box.

4. The VAV box of claim 1, wherein the controller is located outside the VAV box and configured to send commands to the VAV box via a data connection between the controller and the VAV box.

5. The VAV box of claim 4, wherein the controller is located within at least one of:
the building space to which the VAV box discharges the airflow;
a same building as the VAV box but outside the building space to which the VAV box discharges the airflow;
a different building from the building in which the VAV box is located; or
a cloud-based computing system separate from the building in which the VAV box is located.

6. The VAV box of claim 1, wherein the air cleaning device is a filter.

7. The VAV box of claim 6, wherein the air cleaning device is an electrostatic filter, wherein circuitry of the VAV box provides electricity to both the fan and the electrostatic filter.

8. The VAV box of claim 1, wherein the fan is an axial fan.

9. A variable air volume (VAV) box for a building HVAC system, the VAV box comprising:
a first air inlet configured to receive primary airflow from an air handling unit of the building HVAC system;
a damper operable to modulate the primary airflow through the VAV box;
a second air inlet configured to receive secondary airflow drawn from air within a building space;
one or more air outlets configured to discharge a total airflow from the VAV box to the building space, the total airflow comprising the primary airflow and the secondary airflow;
a fan positioned between the second air inlet and the one or more air outlets and operable to modulate the secondary airflow through the VAV box;
an air filter positioned between the second air inlet and the one or more air outlets and configured to affect an air quality of the secondary airflow; and
a controller configured to operate the fan to control the secondary airflow based on a target value for the air quality for at least one of the total airflow or the air within the building space.

10. The VAV box of claim 9, wherein the air filter and the second air inlet are positioned at a boundary of the building space and a secondary air plenum is located between the filter and the fan to guide the secondary airflow between the filter and the fan.

11. The VAV box of claim 10, wherein the boundary of the building space is defined by a drop ceiling and the air filter is accessible from the building space beneath the drop ceiling.

12. The VAV box of claim 9, wherein the target value for the air quality is a target value for an air quality metric that is affected by filtering the secondary airflow.

13. The VAV box of claim 9, wherein the controller is further configured to operate the damper to control the primary airflow, wherein the controller is configured to determine a fan setpoint and a damper setpoint based on the target value for the air quality.

14. The VAV box of claim 9, wherein the target air quality value is a threshold airflow.

15. The VAV box of claim 9, wherein the target air quality value is determined as a function of occupancy of the building space.

16. The VAV box of claim 9, wherein the target value for the air quality is determined as a function of an infection probability.

17. The VAV box of claim 9, wherein the controller is configured to use known or estimated values of a property of the primary airflow and a property of the secondary airflow to determine target proportions of the primary airflow and the secondary airflow to combine to create the total airflow to achieve the target value for the air quality.

18. The VAV box of claim 9, wherein the air filter is selectively repositionable relative to the first air inlet and the second air inlet to selectively filter airflows through either or both of the first air inlet or the second air inlet.

19. The VAV box of claim 9, comprising an actuator configured to reposition the air filter.

20. The VAV box of claim 9, further comprising a replacement mechanism configured to be automatically controlled by the controller to remove the air filter and install a new air filter.

21. The VAV box of claim 9, further comprising a sterilization component configured to sterilize the air filter in response to a determination that the air filter should be replaced.

22. A HVAC system, comprising:
a variable air volume (VAV) box comprising a fan operable to induce airflow from a building space through the VAV box and discharge the airflow back to the building space;
a removable filter positioned between a zone air intake of the VAV box and outlet of the VAV box such that the removable filter is positioned to clean the airflow through the VAV box before discharging the airflow back to the building space, the removable filter configured to affect an air quality of airflow through the VAV box by cleaning the airflow through the VAV box; and
a controller configured to operate the VAV box in a normal operating mode, switch operation of the VAV box to a filtration operating mode in response to an indication, and operate the VAV box in the filtration operating mode;
wherein the VAV box is operated to provide different airflows in the filtration operating mode as compared to the normal operating mode;
wherein the controller is configured to operate the fan to control the airflow through the VAV box to achieve a target for the air quality of at least one of the airflow discharged from the VAV box or air within the building space.

23. The HVAC system of claim 22, wherein the removable filter is accessible from below a drop ceiling.

24. The HVAC system of claim 22, wherein the controller is configured to operate the VAV box in the filtration operating mode by controlling one or more of the different airflows based on a threshold airflow amount for the filtration operating mode.

25. The HVAC system of claim 22, wherein the threshold airflow amount is determined as a function of an estimated infection risk.

26. The HVAC system of claim 22, wherein the threshold airflow amount is determined as a function of measured pollution in a space served by the VAV box.

27. The HVAC system of claim 22, wherein the threshold airflow amount is determined as a function of occupancy in a space served by the VAV box.

28. The HVAC system of claim 22, wherein the controller is configured to determine that the removable filter should be removed and replaced based on measurements of a current drawn by a fan motor of the VAV box.

29. The HVAC system of claim 22, wherein the controller is configured to generate a notification to a user in response to determining that the removable filter should be replaced.

30. A method of purifying air in a building space, comprising:
   directing a primary airflow through a first filter located at an air handling unit;
   directing a secondary airflow through a second filter located in an airflow pathway for an induced air inlet of a variable air volume box;
   controlling the variable air volume box to mix the primary airflow and the second airflow after filtration by the first filter and the second filter before discharge to a building space;
   wherein controlling the variable air volume box comprises:
      controlling a fan of the variable air volume box using a first set of control logic in a normal operating mode; and
      controlling the fan using a second set of control logic in response to an indication that enhanced air filtration is required for the building space.

31. The method of claim 30, wherein controlling the fan using the second set of control logic comprising generating a control signal for the fan based on measured occupancy of the building space.

32. The method of claim 30, wherein controlling the fan using the second set of control logic comprising generating a control signal for the fan based on estimated infection risk for occupants of the building space.

33. The method of claim 30, wherein controlling the fan using the second set of control logic comprising generating a control signal for the fan based on a particulate matter measurement at the building space.

34. The method of claim 30, wherein controlling the variable air volume box further comprises:
   monitoring a current draw of a motor of the fan;
   determining, based on the current draw, that the second filter is in condition to be replaced; and
   generating a notification indicating that the second filter should be replaced.

35. The method of claim 30, wherein controlling the variable air volume box further comprises:
   monitoring a current draw of a motor of the fan;
   determining, based on the current draw, that the second filter is in condition to be replaced; and
   automatically replacing the second filter with a new second filter.

36. The method of claim 30, wherein controlling the variable air volume box further comprises:
   monitoring a current draw of a motor of the fan;
   determining, based on the current draw, that the second filter is in condition to be replaced; and
   automatically treating the second filter with ultraviolet light before allowing the second filter to be accessed by a person.

37. A method of controlling a variable air volume (VAV) box that serves a building space, comprising:
   determining an occupancy schedule for the building space;
   controlling the VAV box to run a first zone flush sequence in advance of an expected occupation of the building space based on the occupancy schedule;
   controlling the VAV box to run a normal operating mode to provide occupant comfort during the expected occupation of the building space; and
   controlling the VAV box to run a second zone flush sequence after the expected occupation of the building space;
   wherein the VAV box comprises:
      a fan operable to induce airflow from the building space through the VAV box and discharge the airflow back to the building space;
      an air cleaning device positioned to clean the airflow through the VAV box before discharging the airflow back to the building space and configured to affect an air quality of the airflow by cleaning the airflow through the VAV box; and
      a controller configured to operate the fan to control the airflow through the VAV box to achieve a target for the air quality of at least one of the airflow discharged from the VAV box or air within the building space.

38. The method of claim 37, wherein controlling the VAV box to run the first zone flush sequence comprises controlling a fan of the VAV box to cause air from the building zone to recycle through a filter associated with the VAV box.

39. The method of claim 37, wherein controlling the VAV box to run the first zone flush sequence comprises causing at least a threshold portion of a total air volume in the building space to pass through a filter associated with the VAV box.

40. The method of claim 37, wherein controlling the VAV box to run the second zone flush sequence comprises causing at least a threshold portion of a total air volume in the building space to pass through a filter associated with the VAV box.

41. The method of claim 37, wherein the second zone flush sequence is configured to remove airborne pathogens from air in the building space, the airborne pathogens shed by occupants of the building space during the expected occupation.

42. The method of claim 37, wherein determining the occupancy schedule for the building space comprises predicting the expected occupation of the building space based on historical occupancy measurements.

43. The method of claim 37, wherein determining occupancy schedule for the building space comprises receiving an indication of the expected occupation from a scheduling system.

* * * * *